(12) United States Patent
Dantus et al.

(10) Patent No.: US 11,502,473 B2
(45) Date of Patent: Nov. 15, 2022

(54) LASER APPARATUS INCLUDING AN OPTIC DISPERSION COMPENSATOR

(71) Applicant: Board of Trustees of Michigan State University, East Lansing, MI (US)

(72) Inventors: Marcos Dantus, Okemos, MI (US); Vadim Lozovoy, Holt, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 326 days.

(21) Appl. No.: 16/644,999

(22) PCT Filed: Aug. 29, 2018

(86) PCT No.: PCT/US2018/048440
§ 371 (c)(1),
(2) Date: Mar. 6, 2020

(87) PCT Pub. No.: WO2019/050724
PCT Pub. Date: Mar. 14, 2019

(65) Prior Publication Data
US 2020/0212643 A1    Jul. 2, 2020

Related U.S. Application Data

(60) Provisional application No. 62/555,199, filed on Sep. 7, 2017.

(51) Int. Cl.
*H01S 3/00* (2006.01)
(52) U.S. Cl.
CPC .................................. *H01S 3/0057* (2013.01)
(58) Field of Classification Search
CPC ........................... H01S 3/0057; G02B 27/0944
See application file for complete search history.

(56) References Cited

U.S. PATENT DOCUMENTS

| | | | |
|---|---|---|---|
| 6,198,568 B1 | 3/2001 | Galvanauskas et al. | |
| 6,739,728 B2 * | 5/2004 | Erbert | G02B 17/004 |
| | | | 359/615 |
| 2015/0043054 A1 * | 2/2015 | Booth | G02B 27/09 |
| | | | 359/291 |

FOREIGN PATENT DOCUMENTS

| WO | WO-1989/07352 A1 | 8/1989 |
|---|---|---|
| WO | WO-2004109869 A2 | 12/2004 |

OTHER PUBLICATIONS

International Search Report dated Nov. 7, 2018 in corresponding PCT Application No. PCT/US2018/048440.

* cited by examiner

*Primary Examiner* — Michael Carter
(74) *Attorney, Agent, or Firm* — Harness, Dickey & Pierce PLC

(57) ABSTRACT

A laser apparatus includes an optic dispersion compensator. In another aspect, an optic (40, 45) uses phase wrapping to compress or stretch a laser pulse. A further aspect includes an apparatus and method for binary-phase compression of stretched laser pulses. In yet another aspect, a single monolithic transmissive or reflective optic (40, 45) provides compression or stretching of a laser pulse using a sinusoidal pattern for introducing binary steps. Another aspect provides a stretching or compressing optic (40, 45) for retarding a phase of multiple frequency regions of a laser pulse by a factor of 2? or less. Still another aspect employs a volume grating or multi-layer mirror including phase wrapping to obtain discontinuous phase jumps in a laser pulse compressor (45) or stretcher (40). Methods of using or making the laser apparatus are also provided.

23 Claims, 23 Drawing Sheets

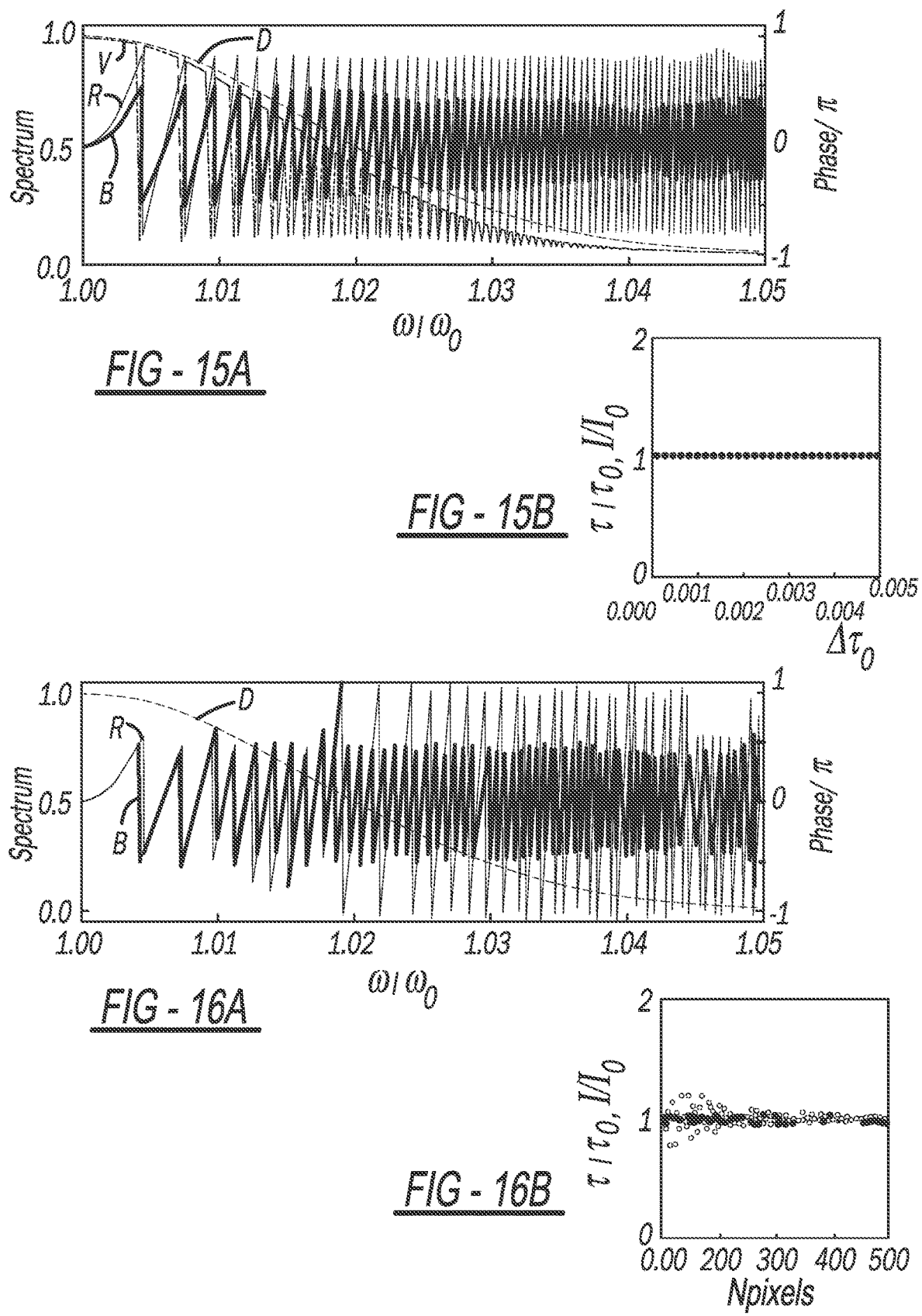

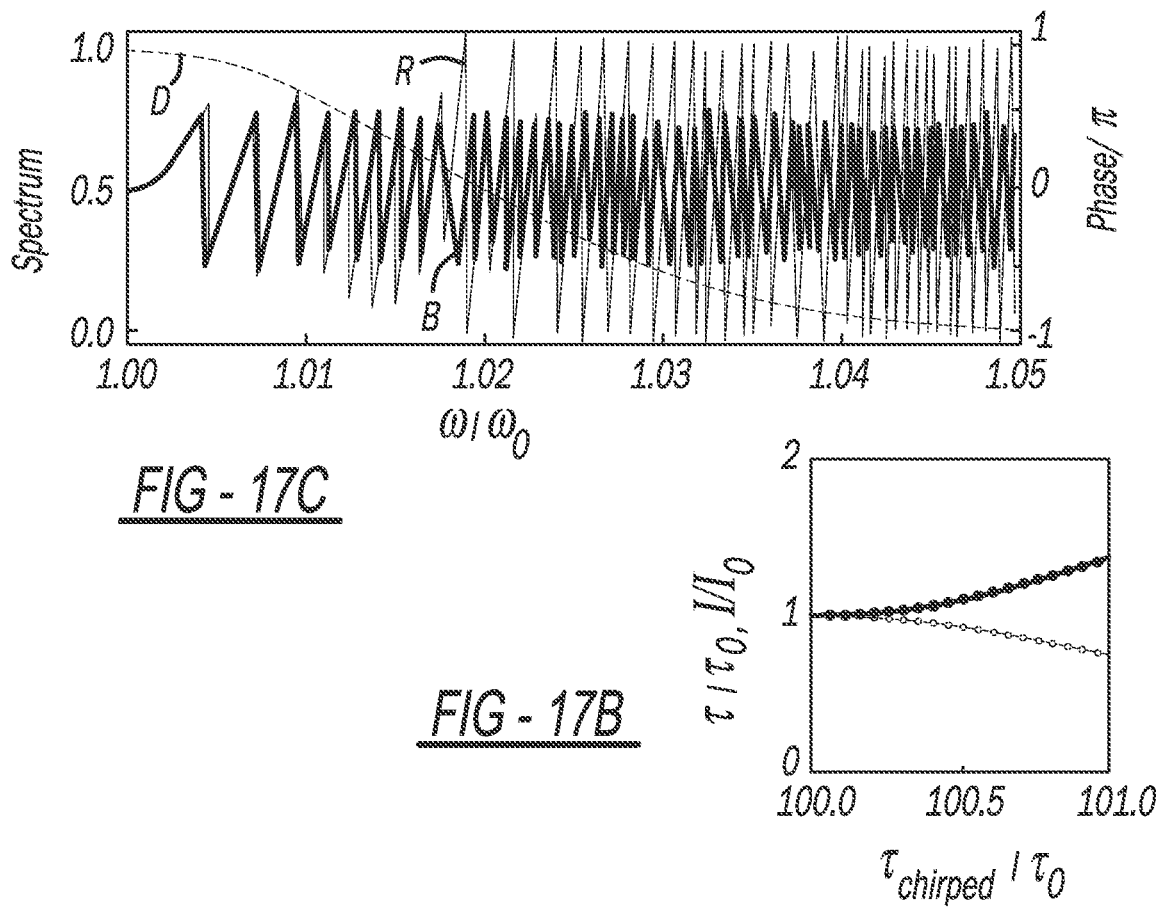
FIG - 17C
FIG - 17B
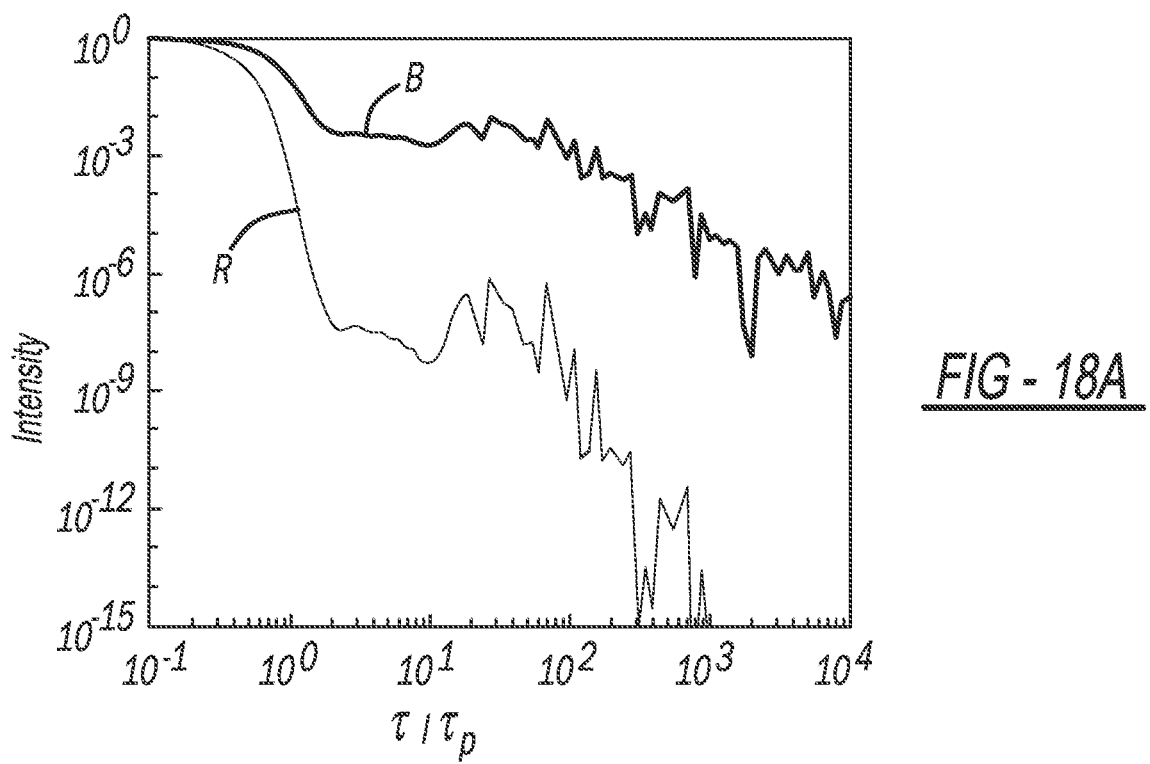
FIG - 18A

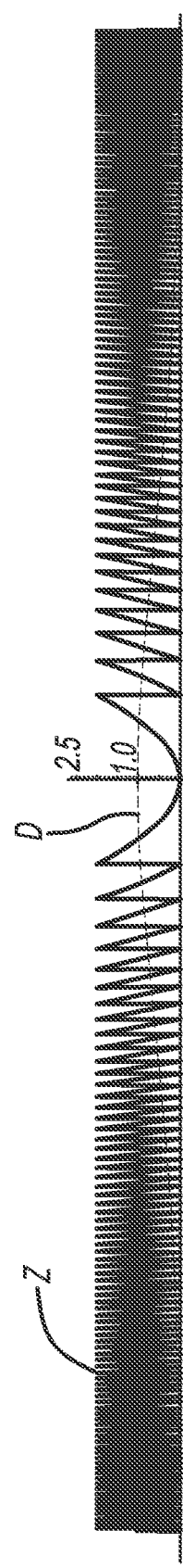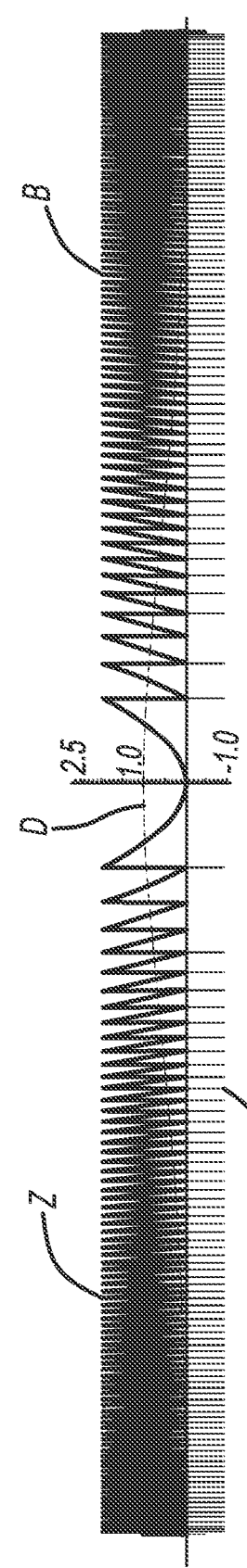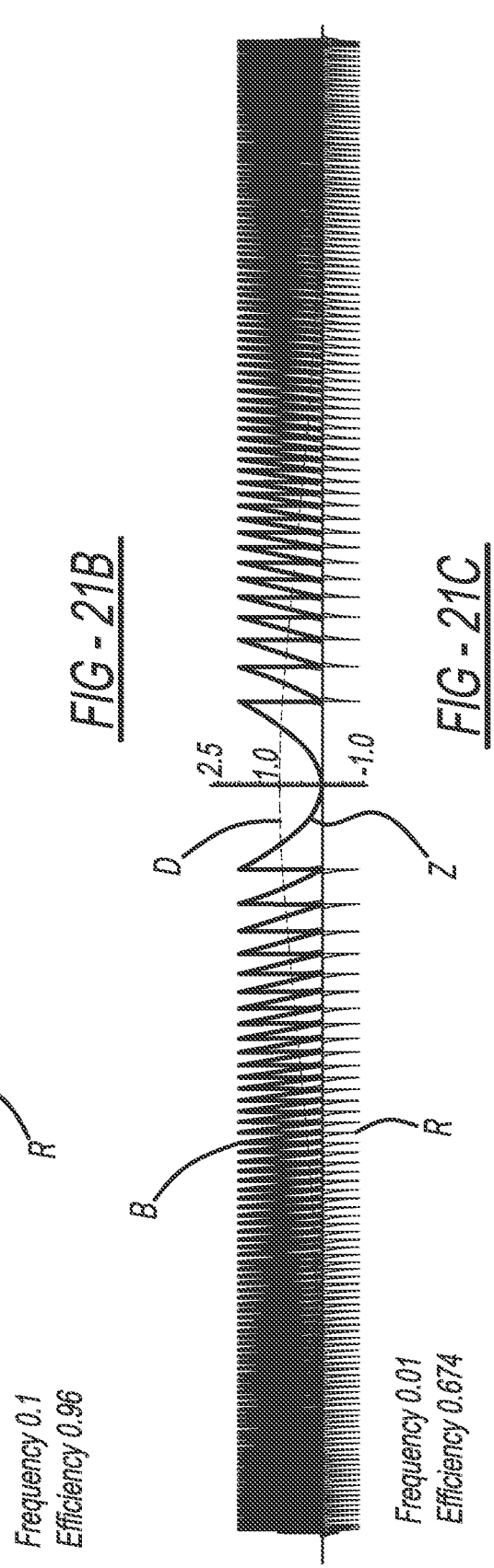

LASER APPARATUS INCLUDING AN OPTIC DISPERSION COMPENSATOR

CROSS-REFERENCE TO RELATED APPLICATION

This application is a National Phase Entry of International Patent Application No. PCT/US2018/048440, filed on Aug. 29, 2018, which claims the benefit of U.S. Provisional Application No. 62/555,199 filed Sep. 7, 2017. The entire disclosure of the above applications are incorporated herein by reference.

FEDERAL FUNDING

This invention was made with government support under DESC0002325 awarded by the U.S. Department of Energy. The government has certain rights in the invention.

BACKGROUND AND SUMMARY

The present application relates generally to a laser apparatus and more particularly to a laser apparatus including an optic dispersion compensator and a method of using same.

Energy scale-up of ultrafast laser sources relies on temporal stretching of laser pulses prior to amplification via chirped pulse amplification ("CPA"). As ultrafast sources gain acceptance in medicine and industry, the expense and robustness of pulse compressors need improvement. Lasers with pulse energies in the hundreds and even thousands of Joules are being considered, however, traditional compressors for those sources are extremely expensive because of the need for gratings and mirrors with areas exceeding 1 m² that require precise alignment inside vacuum chambers, which is impractical in a commercial setting.

Binary pulse shaping has been previously utilized. For example, see U.S. Pat. No. 8,861,075 entitled "Laser Amplification System" issued on Oct. 14, 2014, and PCT International Patent Publication No. WO 2017/059018 entitled "Laser Pulse Including Flat Top" published on Apr. 6, 2017, where are commonly invented by the present inventors. Furthermore, a fixed optic for use as a pulse shaper is disclosed in U.S. Pat. No. 8,208,504 entitled "Laser Pulse Shaping System" which issued on Jun. 26, 2012, and is also commonly invented by the present inventors. All of these patents are incorporated by reference herein. While they are all significant advances in the field, there is further room for improvement especially for compressors and stretchers, in contrast to shapers, and since more powerful lasers are being utilized.

In accordance with the present invention, a laser apparatus includes an optic dispersion compensator. In another aspect, an optic uses phase wrapping to compress or stretch a laser pulse. A further aspect includes an apparatus and method for binary-phase compression of stretched laser pulses. In yet another aspect, a single monolithic transmissive or reflective optic provides compression or stretching of a laser pulse using a sinusoidal pattern for introducing binary steps. Another aspect provides a stretching or compressing optic for retarding a phase of multiple frequency regions of a laser pulse by a factor of 2π or less. Still another aspect employs a grating or mirror including phase wrapping to obtain discontinuous phase jumps in a laser pulse compressor or stretcher. Methods of using or making the laser apparatus are also provided.

Given that pulse compression is a process that brings in-phase all of the frequencies within the spectrum of the pulse, a frequency domain approach is employed in which out-of-phase components are brought into phase by a π step. The resulting binary spectral phases, containing values of zero and π, have ability to compress pulses. Furthermore, blocking certain regions of the spectrum through destructive interference leads to an increase in second harmonic generation ("SHG") via an approach that is analogous to Fresnel zone plates. In general, the delivery of large negative dispersion is analogous to creating a large lens, which was solved by the Fresnel lens in a general optical sense.

The present apparatus and method are advantageous over conventional designs. For example, the present optic is expected to be considerably less expensive to manufacture because as a single optic, and not a combination of two or more optics, it can be mass produced. The optic is significantly more compact compared to conventional compressors, this being especially beneficial when used with high power lasers of at least 1 mJ and be even more beneficial with those of 100 mJ. Furthermore, the present optic avoids the need to align multiple optical components. It is noteworthy that the optic design does not require the traditional total dispersion thickness of conventional dispersion optics because it takes advantage of phase steps that greatly reduce the need for overall thickness. Moreover, the present apparatus is expected to stretch or compress the laser pulse at least 100 times with an energy efficiency of at least 70%. Additional advantages and features of the present apparatus and method can be found in the following description and claims in addition to the appended drawings.

BRIEF DESCRIPTION OF THE DRAWINGS

FIGS. 18A-C are graphs showing expected results in operating cross-polarized wave generation for stretched pulses which are binary phase compressed, using the present laser apparatus;

FIGS. 21A-C are graphs showing expected results of a wrapped phase of a chirped pulse, using the present laser apparatus;

DETAILED DESCRIPTION

The laser apparatus of the present disclosure includes an optic dispersion compensator. The present laser apparatus, the method of using same and method of making same will first be described with regard to the general photonic principles and concepts, second as employed in a laboratory set-up, third numerical simulation, and then fourth as used in a commercial set-up. It is noteworthy that the commercial set-up allows for a single monolithic, and predetermined optic, acting as a laser pulse compressor or stretcher, which is of a much smaller thickness as compared to traditional devices. The present single optic uses a Fresnel type of approach to retard a phase of frequency regions of the pulse by a factor of $2\pi$ or less. The details will be more specifically discussed hereinafter.

A. General Principles of Stretching and Compression

Some basic formulas are first reviewing before the concept of binary phase compression is introduced. The electric field strength in the time domain E(t) can be represented as a Fourier integral of the complex spectrum E($\omega$)

$$\tilde{E}(t) \propto E(t) + c.c. = \int E(\omega) e^{i\omega t} d\omega + c.c., \quad (1)$$

where the spectral phase $\varphi(\omega)$ controls the time dependence of the field $|E(\omega)|$ according to $$E(t) = \int |E(\omega)| e^{i\varphi(\omega)} e^{-i\omega t} d\omega. \quad (2)$$

Temporal pulse stretching is typically accomplished through the introduction of chirp, which corresponds to the introduction of a quadratic spectral phase $$\varphi(\omega) = 1/2\varphi''(\omega-\omega_0)^2. \quad (3)$$

Figure 5A:
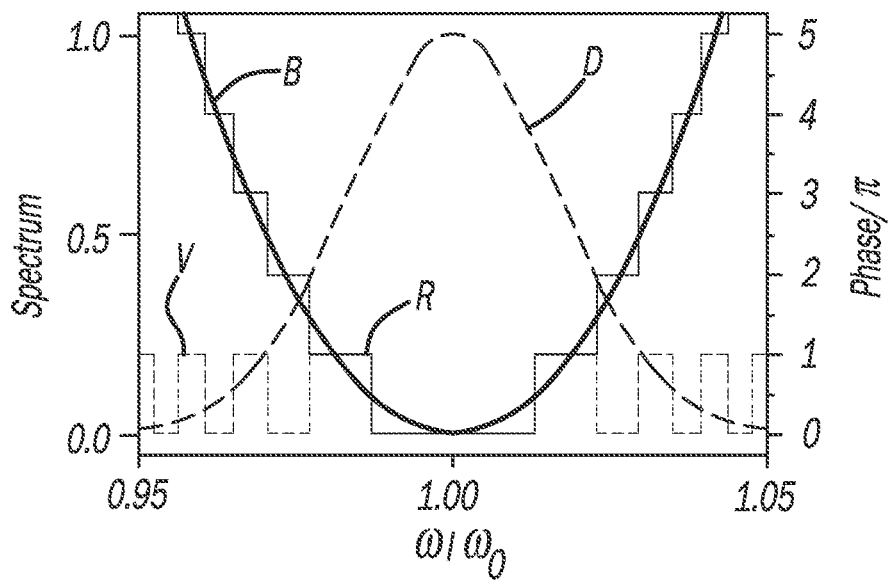
FIGS. 5A-D are graphs showing general principals of binary phase compression used by the present laser apparatus.

If the pulse spectrum has a Gaussian shape (see the dashed curved line D in FIG. 5A)

$$|E(\omega)| = \exp[-1/2\tau_0^2(\omega-\omega_0)^2], \quad (4)$$

then the transform limited ("TL") pulse in the time domain has a Gaussian shape with pulse duration given by $\tau_0 = \tau/2\sqrt{\ln(2)} \cong 0.601\tau$, where $\tau$ is the full width at half maximum ("FWHM"), such that $$|E(t)| = \exp[-1/2t^2\tau_0^{-2}]. \quad (5)$$

Temporal pulse stretching by N times requires a chirp of value $\varphi'' = N\tau_0^2$ (see the solid curved line B in FIG. 5A) corresponding to the complex spectral field $$E(\omega) = \exp\left[-\frac{1}{2}\tau_0^2(\omega-\omega_0)^2\right]\exp\left[-i\frac{N}{2}\tau_0^2(\omega-\omega_0)^2\right]. \quad (6)$$

Figure 5B:
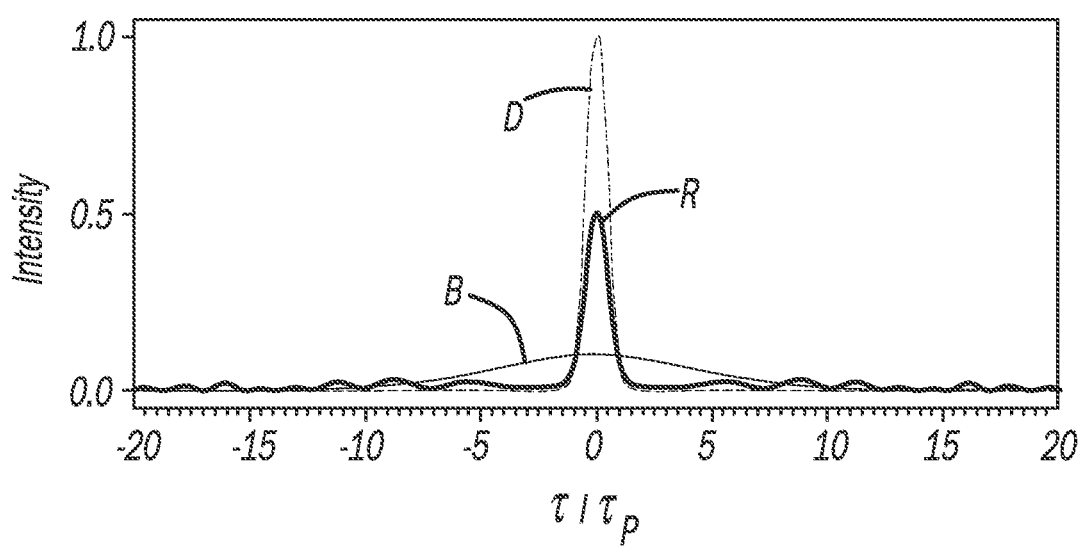

The temporal intensity profile of this pulse is stretched and its peak intensity drops by N times (see the solid curved line B in FIG. 5B)

$$I(t) \cong \left(\frac{I_{max}}{N}\right)\exp\left[-\frac{t^2}{N^2\tau_0^2}\right]. \quad (7)$$

It is instructive to analyze how different spectral components add up together to produce the stretched pulse. There are spectral regions where the phase difference between spectral components equals $\pi$. These components are out of phase, or in other words, they have opposite signs because $e^{i\pi} = -1$. For large chirp values, there are many close spectral components of approximately equal amplitude with opposite signs that destructively interfere, therefore, the peak intensity decreases and the pulse is stretched.

To compress such a chirped stretched pulse, one typically would introduce a phase with the opposite chirp sign in conventional devices. A coarse approach has been used that changes the phase only for the frequency components that are out-of-phase. To accomplish this, the frequencies that are out of phase are found, i.e., their phase equals $n\pi$, with n being an odd number. For those frequencies, a $\pi$ phase value is added or subtracted to cause them to constructively interfere. The phase is kept without charge when n is an even number. Such binary-phase compression is shown as the stepped line R in FIG. 5A. The x-axis is relative to the carrier frequency. The 'staircase' or stepped looking line crosses the spectral phase being compressed at frequencies where the phase equals $n\pi$. The alternating rectangular peak and valley line V corresponds to a different representation of the same phase (as shown in the stepped line R) because phase is a cyclic function with a period of $2\pi$. Hence, any odd $n\pi$ can be replaced with $\pi$ whereas even $n\pi$ are replaced with 0. Applying this phase compresses the pulse in the time domain, as shown in 5B where the solid sharply peaked line R corresponds to the binary-phase compressed pulse (chirped and binary-phase compressed). The x-axis is a ratio of time to duration of the pulse.

Figure 5C:
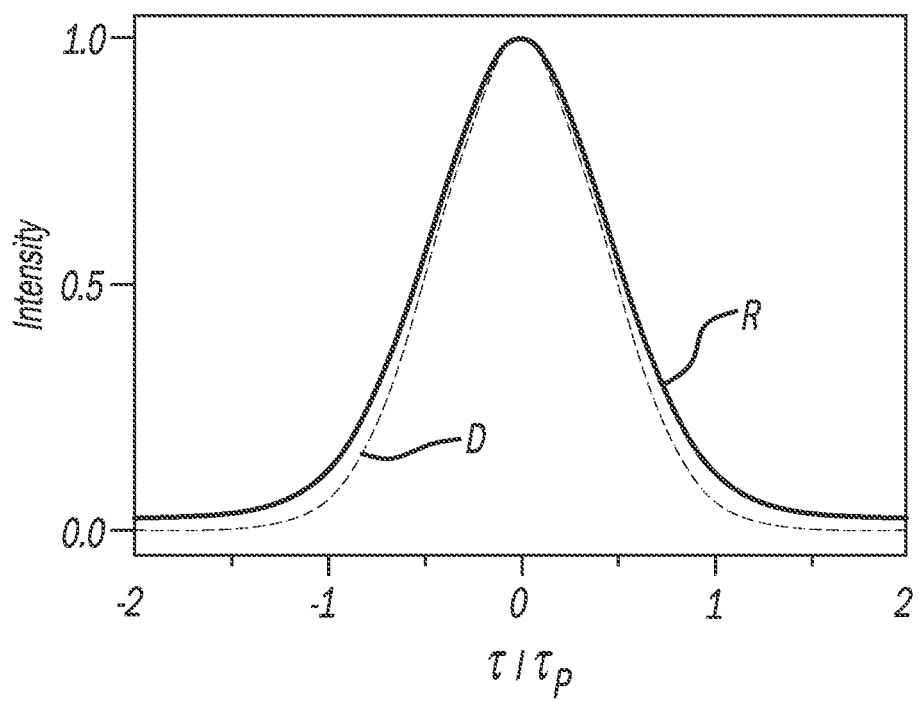
Figure 5D:
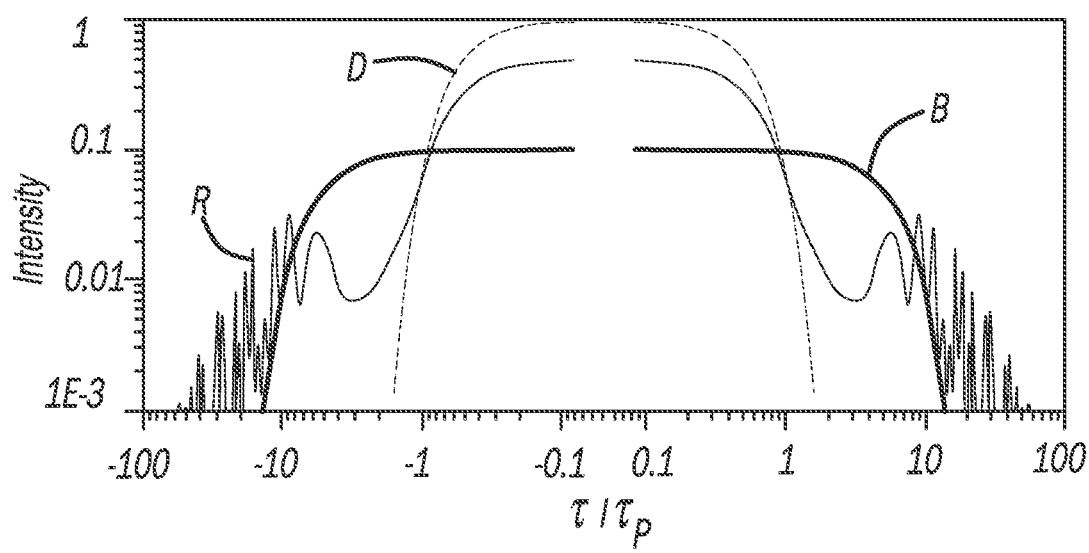

When normalized to unit intensity, the TL pulse (see the dashed line D) in FIG. 5C is very close to the profile of the stretched and binary-phase compressed pulse. For this example, the pulse was stretched only by a factor of 10; when plotted in logarithmic scale, as illustrated in FIG. 5D, the chirped pulse (see the solid line B) has a 10 times smaller peak intensity than the TL pulse (see the dashed line D). The amplitude of the binary-phase compressed pulse (line R) is about 0.5 from the maximum; the compressed pulse duration at FWHM is very close to the TL pulse. Because pure phase modulation is used in this example, approximately half of the energy is not lost but actually spread over very long times. This energy looks like noise beyond the chirped pulse duration as depicted in the log-log plot in FIG. 5D.

B. Expected Experiment Results

The expressions provided above can be implemented in a laboratory using a calibrated pulse shaper capable of compressing the pulses to within 0.1% of the theoretical transform limit. Pulse compression is based on a MIIPS approach. An experimental setup includes a regeneratively amplified Ti:sapphire laser (preferably the Spitfire model from Spectra Physics Inc.) producing 1 mJ pulses at 1 kHz. The output is split, reserving one arm for a cross-correlation setup. The main portion of the beams is directed to a pulse shaper (preferably a MIIPS-HD type from BioPhotonic Solutions Inc.). Both beams are then focused non-collinearly into a nonlinear crystal (of a BBO type) using a 300 mm focal length achromatic lens. The second-harmonic signal is recorded with a spectrometer (preferably a USB 4000 model from Ocean Optics) as a function of time delay to produce the cross-correlation function. Cross-correlations are measured using a Mach-Zehnder interferometer in which one arm is left "as-is" (the reference arm) and applying the phase mask to the other arm (the pulse shaper arm).

The scans are realized for TL pulses as well as for chirped pulses stretched by a factor of 10 and 100, using a quadratic phase with values of 10,000 $fs^2$ and 100,000 $fs^2$, respectively, and for the same stretched pulses after adding the binary-phase compression mask as prescribed above. Technically speaking, the binary compression mask is added to the stretching mask. It is worth noting that the currently shown binary compression is applied to pulses that are stretched using a quadratic phase mask, however, other phase masks as well as other stretching forms such as dissipative solitons are still amenable to the present apparatus.

Figure 6A:
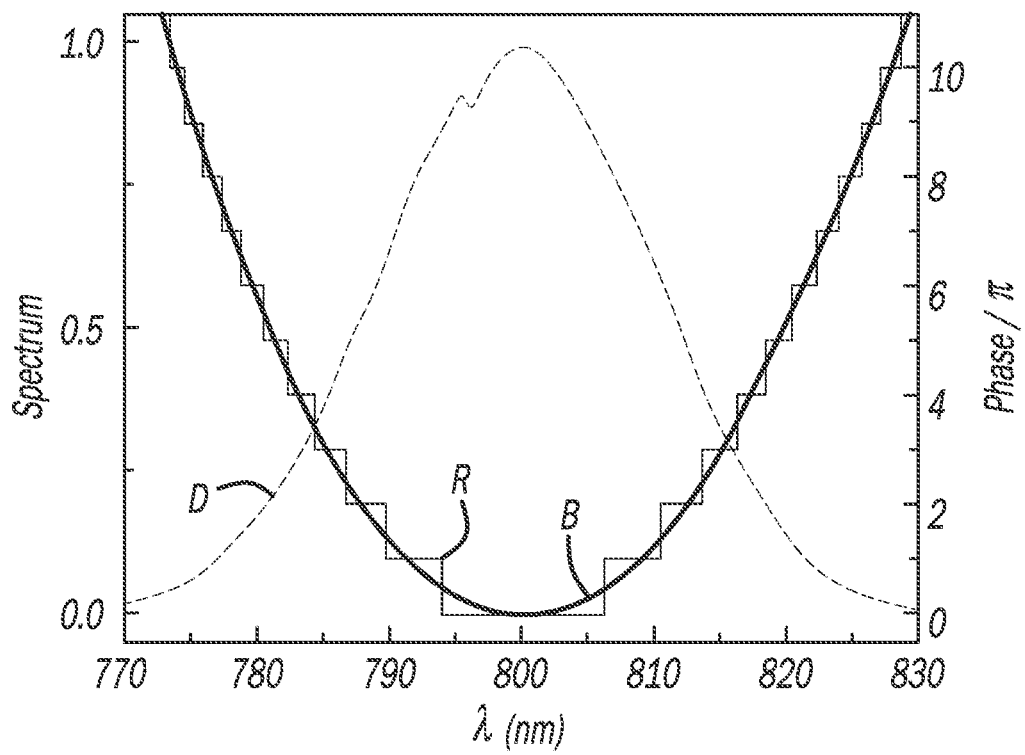
FIGS. 6A-D are graphs showing expected experimental results of stretched pulses after adding binary phase compression from the present laser apparatus.
Figure 6B:
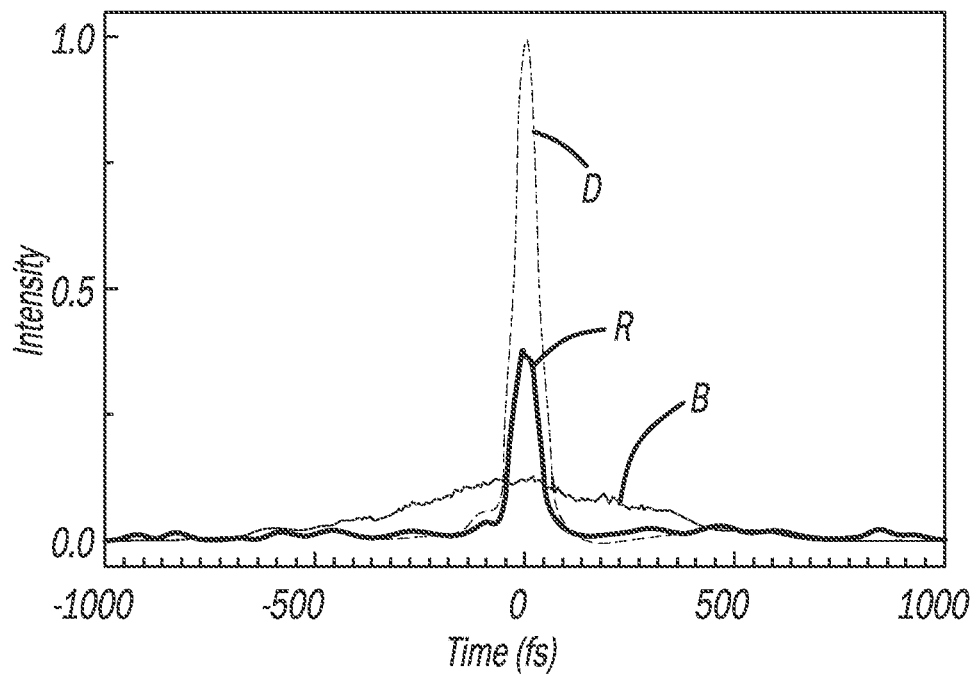
Figure 6C:
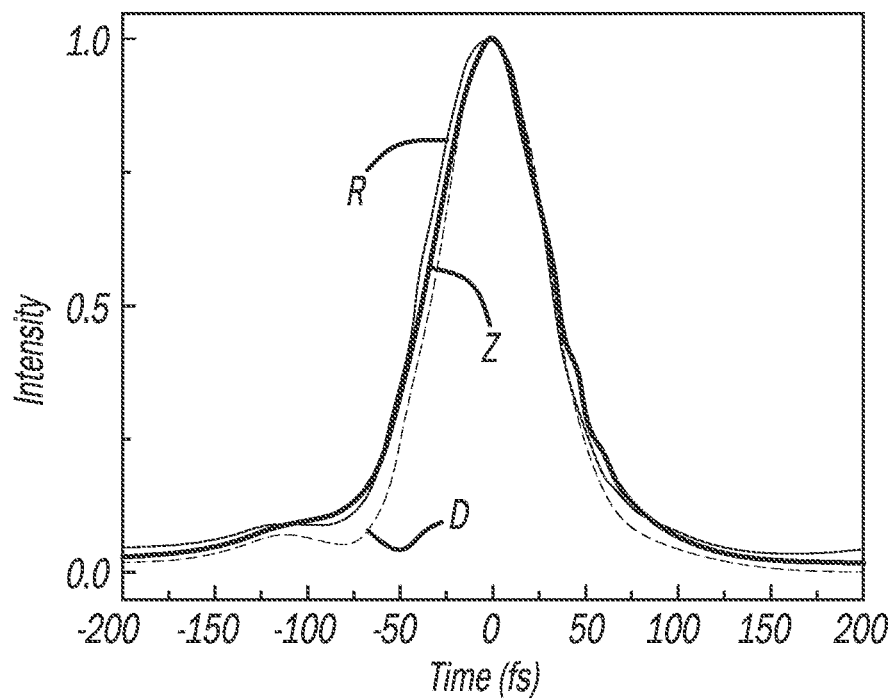
Figure 6D:
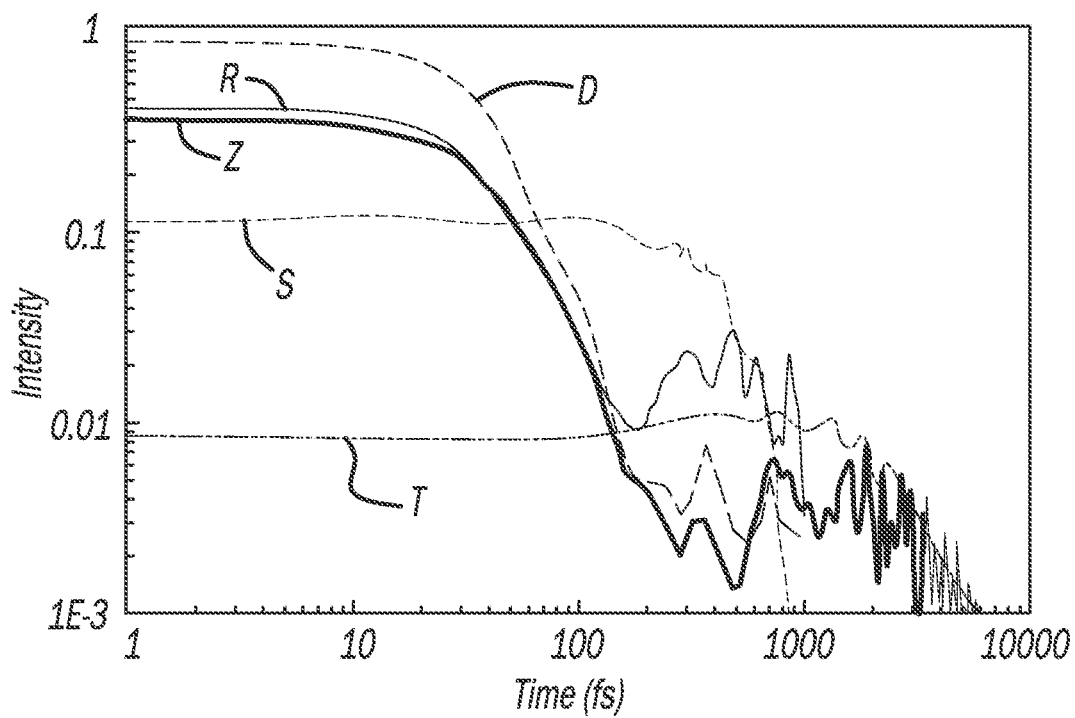

Expected experimental results are presented in FIG. 56A-D, FIG. 6A graphs the spectrum and phases used to stretch the pulse 10 times using a chirp value of 10,000 000 $fs^2$ (line B) and binary (line R) phase added to compress it back to have FWHM as for TL pulse. FIG. 6B shows cross-correlation functions of TL pulse (line D) 10 times stretched (line B) and binary compressed pulse (line R). FIG. 6C graphs cross-correlation functions for TL pulse (line D) and binary compressed pulse that is originally 10 times stretched (line R) and 100 times stretched (line Z) normalized on the maximum. Also, FIG. 6D show a long time behavior for TL (line D), chirped at 10 (line S) and 100 (line T) times, and binary compressed pulses that were originally chirped at 10 (line R) and 100 times (line Z) log-log scales for positive delay times. In other words, the quality of the compressed pulses is shown in FIG. 6C, where the TL pulses are shown (lower dashed line D), along with the binary-phase compressed pulses after being stretched by a factor of 10 (see line R) and 100 (see line Z). Notice that the TL pulses show that the reference pulse used for the cross-correlation measurements has a small amount of negative third-order dispersion ($\sim-10^3$ $fs^3$). The overall expected experimental performance of binary-phase compression can be appreciated in FIG. 6D, where the duration of the pulses stretched by a factor of 10 (see solid line R) and 100 (see solid line Z) are shown in the log-log scale before (see dashed lines S and T) and after (see associated solid lines R and Z, respectively) compression. Thus, binary-phase compression can recover the original pulse duration.

C. Numerical Simulations

Different binary-phase and amplitude compression approaches are now compared. More specifically, binary-phase compression using different input pulse spectra are evaluated. The practical implementation of this approach requires evaluation for very large stretching factors, up to a factor of one million. Implementation may inevitably suffer from imperfections in the delivery of the binary compression spectral phase, in particular a lack of accuracy and precision.

Hence, the following numerical simulations include some of the most common imperfections expected. Moreover, contrast ratios that can be achieved by binary-phase compression in combination with nonlinear filtering are also addressed.

C.1 Different Methods of Compression

Starting with a pulse having the Gaussian spectrum of Equation (4) and assuming that the stretched pulse is chirped per Equation (3), then it is possible to write an analytical formula for the Fourier integral of Equation (2) for part of the spectrum between frequencies $\omega_1$ and $\omega_2$:

$$E(t) = \int_{\omega_1}^{\omega_2} e^{\frac{1}{2}(i\varphi''-\tau_0^2)\omega^2 - i\omega t} d\omega = \frac{\sqrt{\pi/2}}{\tau_0\sqrt{1-i\varphi''\tau_0^{-2}}} \quad (8)$$

$$e^{-\frac{t^2}{2\tau_0^2(1-i\varphi''\tau_0^{-2})}} \times \left[\mathrm{erf}\left(\frac{\omega_2(\varphi''+i\tau_0^2)-t}{\sqrt{2}\sqrt{i\varphi''-\tau_0^2}}\right) - \mathrm{erf}\left(\frac{\omega_1(\varphi''+i\tau_0^2)-t}{\sqrt{2}\sqrt{i\varphi''-\tau_0^2}}\right)\right].$$

The frequencies where the spectral phase is equal to $n\pi$, which depend on the applied chirp $\varphi''$ are $$\Omega_n = \sqrt{2\pi n/\varphi''}. \quad (9)$$

Then phases are identified which are equal to $\pi$ or 0 between frequencies $\Omega_n^-$ and $\Omega_n^+$ for even and odd n, correspondingly:

$$\Omega_n^- = \sqrt{2\pi(n-0.5)/\varphi''}, \Omega_n^+ = \sqrt{2\pi(n+0.5)/\varphi''}. \quad (10)$$

Accordingly, It is possible to calculate the total electric field using Equation (8).

C.2 Compression of Different Phases

In the previous subsection, the efficient compression of linearly chirped pulses with a Gaussian spectrum was shown. In this subsection, this method is applied for pulses with different spectra and different phase distortions. The formula used to calculate the binary-phase compression for any frequency $\omega$ is relatively simple:

$$\varphi(\omega) = \pi \times \mathrm{round}[\varphi(\omega)/\pi]. \quad (11)$$

Figure 7A:
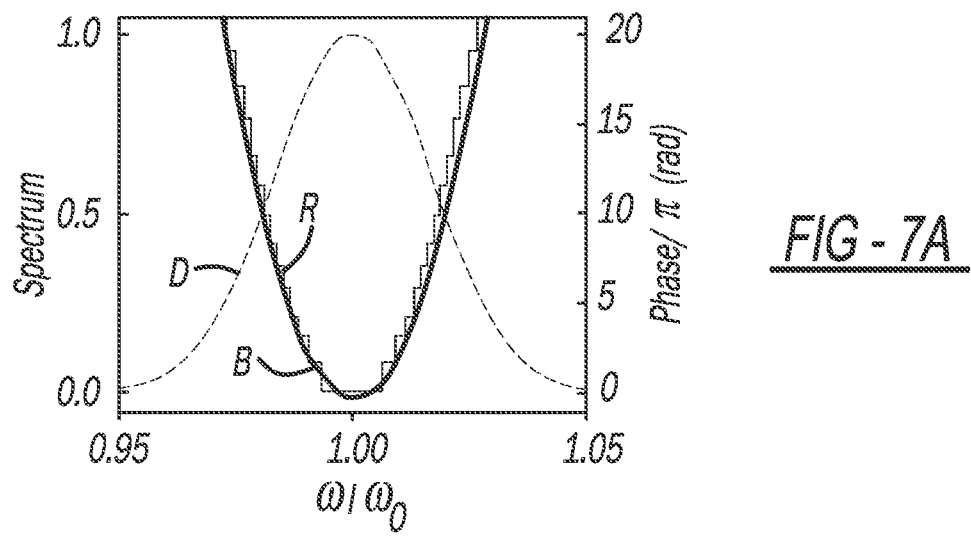
FIGS. 7A-C, 8A-C, 9A-C, 10A-C and 11A-C are graphs showing expected binary phase compression of pulses with different spectra and phase distortions using the present laser apparatus.
Figure 7B:
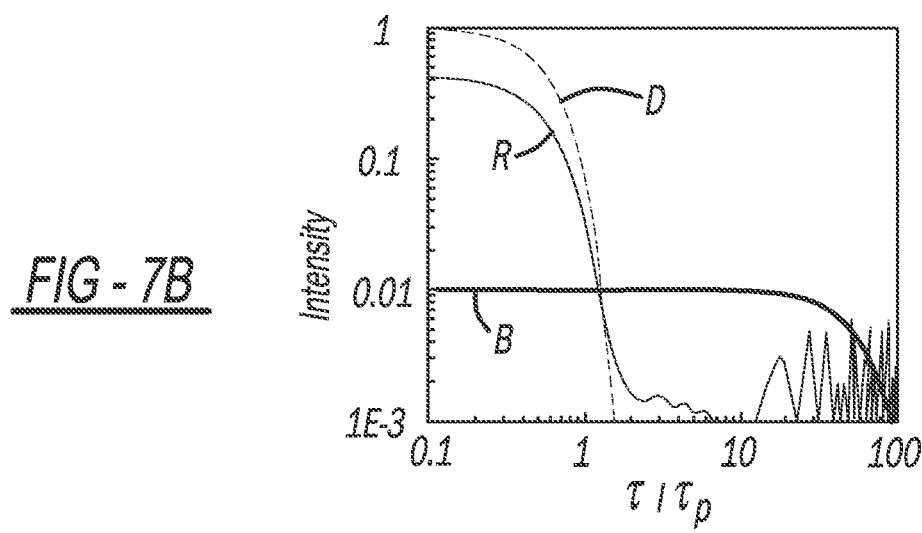
Figure 7C:
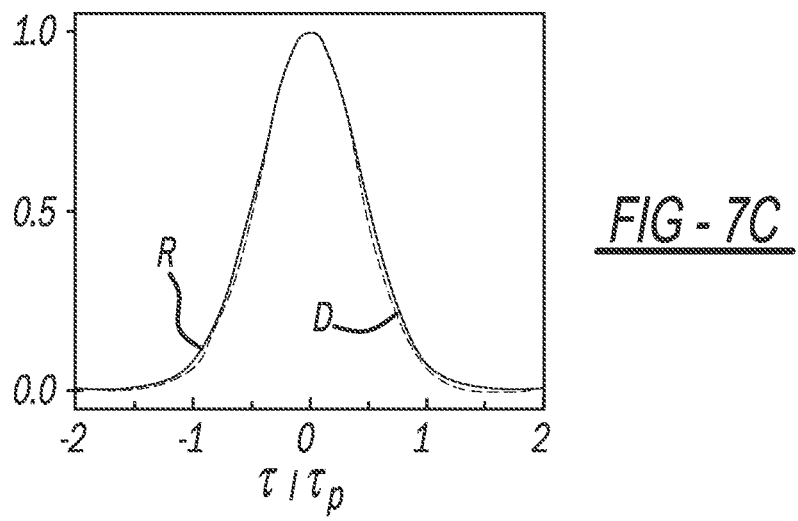
Figure 8A:
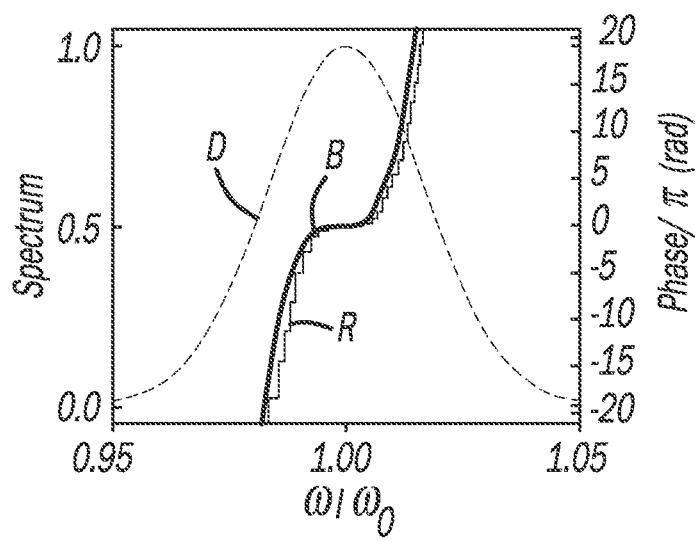
Figure 8B:
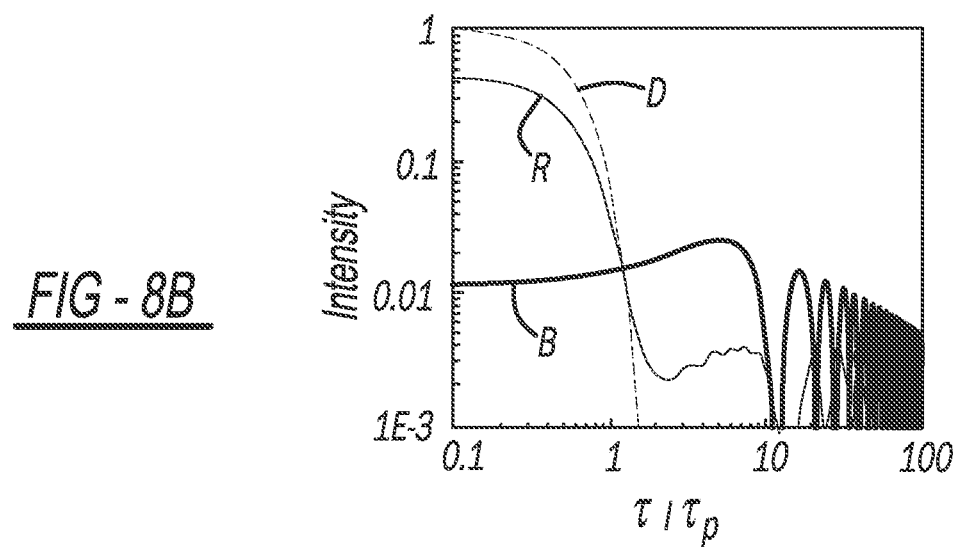
Figure 8C:
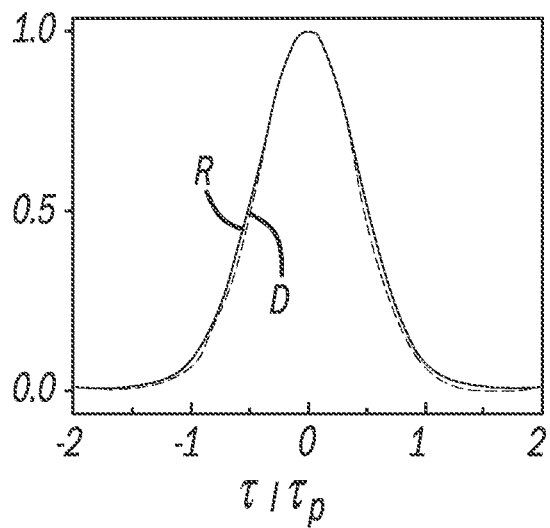
Figure 9A:
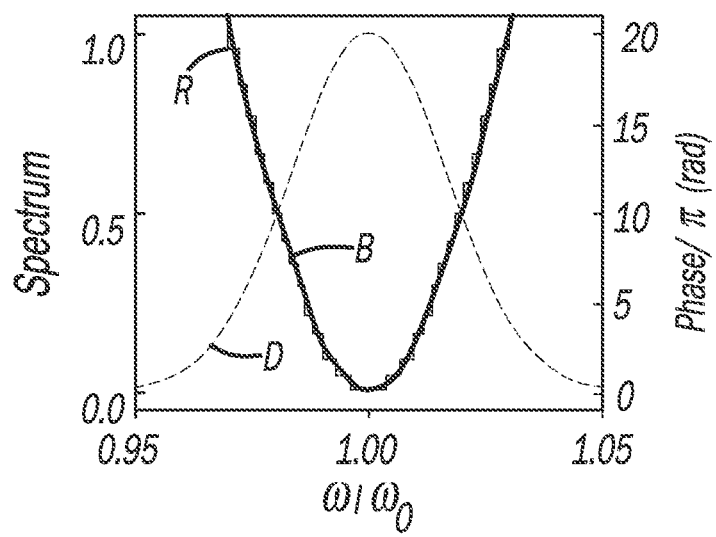
Figure 9B:
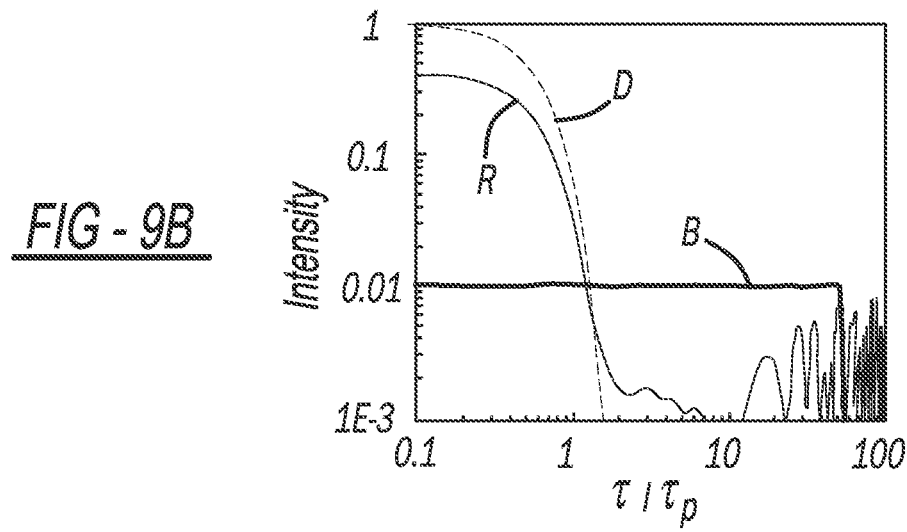
Figure 9C:
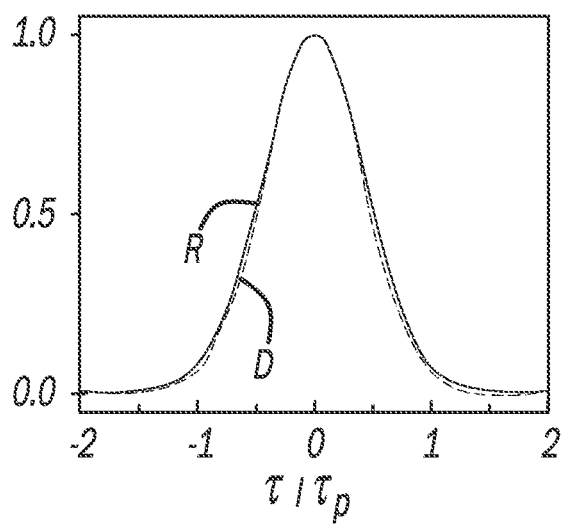
Figure 10A:
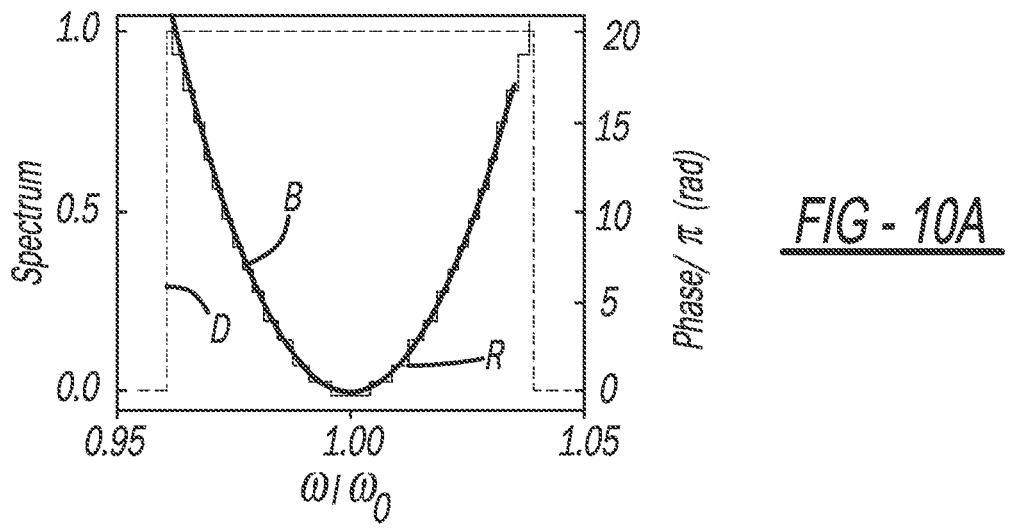
Figure 10B:
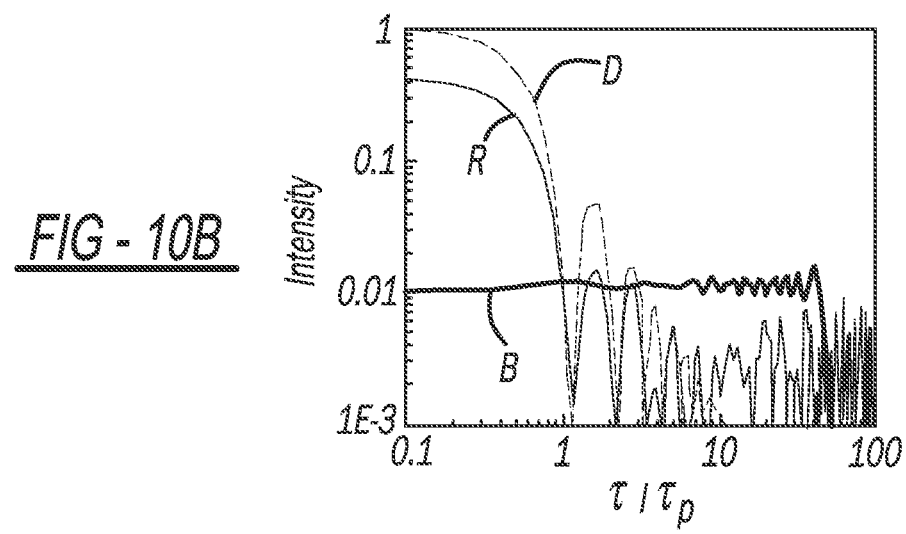
Figure 10C:
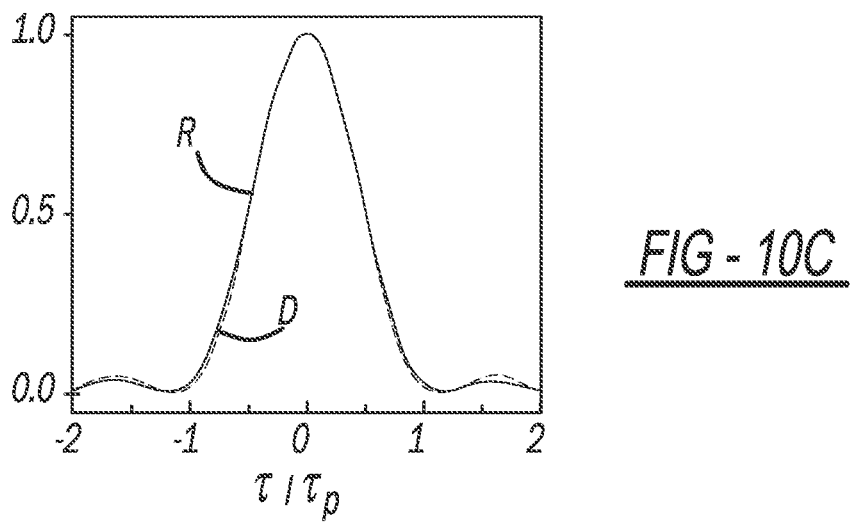
Figure 11A:
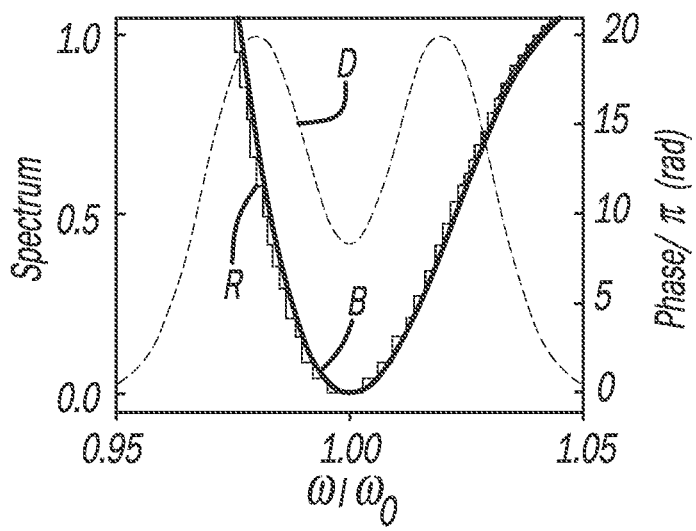
Figure 11B:
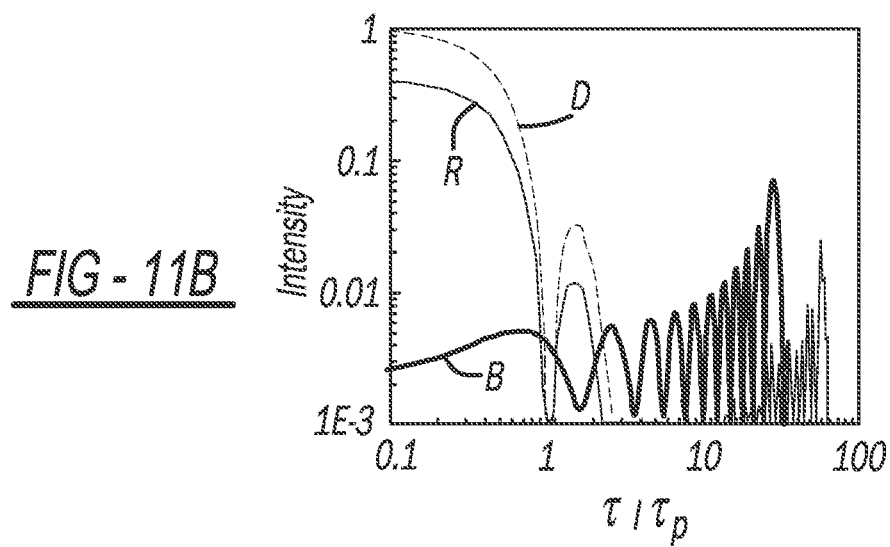
Figure 11C:
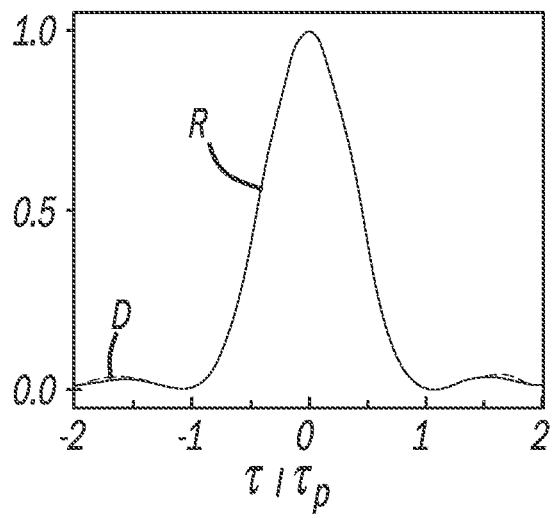

Five different cases are explored: first, FIGS. 7A-C illustrate pulses with a Gaussian spectrum that are stretched 100 times using linear chirp. The x-axis is relative to the carrier frequency. Second, FIGS. 8A-C show a third order (cubic) phase mask applied to stretch the pulse by a factor of 100. The x-axis is the ratio of time to duration of the pulse. Third, FIGS. 9A-C illustrate pulses with a Gaussian spectrum that are stretched to get a square pulse in the time domain using nonlinear phase modulation. Fourth, in FIG. 10A-C, the pulses have a flat-top spectrum and are stretched by chirp. Lastly, FIGS. 11A-C show pulses with a non-Gaussian (double Gauss) spectrum with a complex phase that are composed of both second and third order dispersions. The expected results from binary-phase compression are remarkable. Independent of pulse spectrum and the type of phase used for stretching, all pulses are compressed back to their TL duration, with an intensity time profile identical to that before stretching. In all cases, the peak intensity of the compressed pulses is ~0.4 relative to TL.

C.3 Compression of Highly Stretched Pulses

Figure 12:
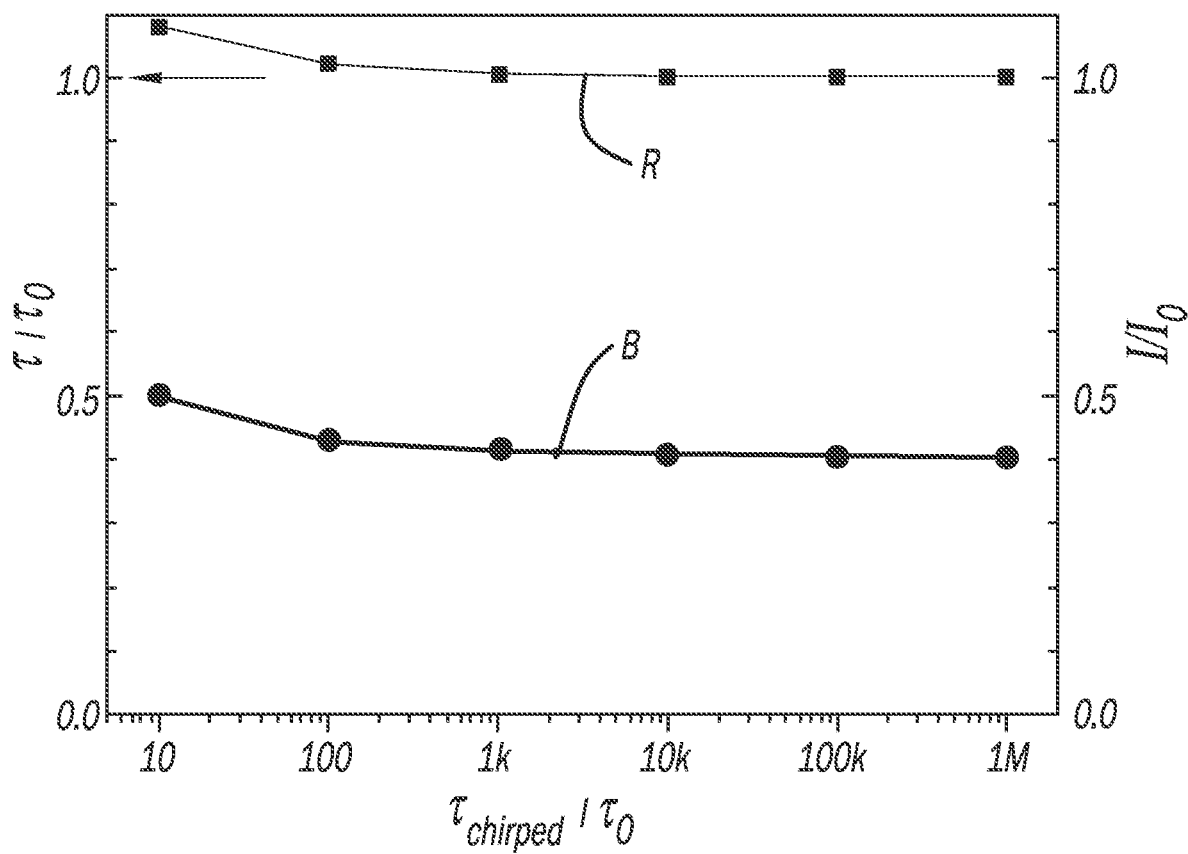
FIG. 12 is a graph showing how binary phase compression is expected to behave when compressing highly stretched pulses using the present laser apparatus.

In this subsection, the theoretical limits of binary-phase compression are explored. In particular, how binary-phase compression behaves when compressing highly stretched pulses. Expected calculated results are shown in FIG. 12. Note that for pulses stretched by more than a factor of 100, the resulting pulse duration is essentially the same as the original TL pulse and the amplitude approaches 0.4 relative to TL. Table I summarizes these expected results.

TABLE I

Compression of pulses with different initial stretching

| Stretching | (Duration)/(TL Duration) | (Intensity)/(TL Intensity) |
|---|---|---|
| 10 | 1.080 | 0.4987 |
| $10^2$ | 1.021 | 0.4311 |
| $10^3$ | 1.006 | 0.4131 |
| $10^4$ | 1.002 | 0.4077 |
| $10^5$ | 1.001 | 0.4053 |
| $10^6$ | 1.000 | 0.4051 |

Pulses were stretched from 1 to 6 orders of magnitude. Their relative pulse duration with respect to TL approaches unity. Furthermore, the peak intensity of the compressed pulses approaches 0.40 compared to the original TL pulse. Thus, the greater the stretching factor, the better the binary-phase compression approach performs.

C.4 Quality of the Compressed Pulses

Figure 13A:
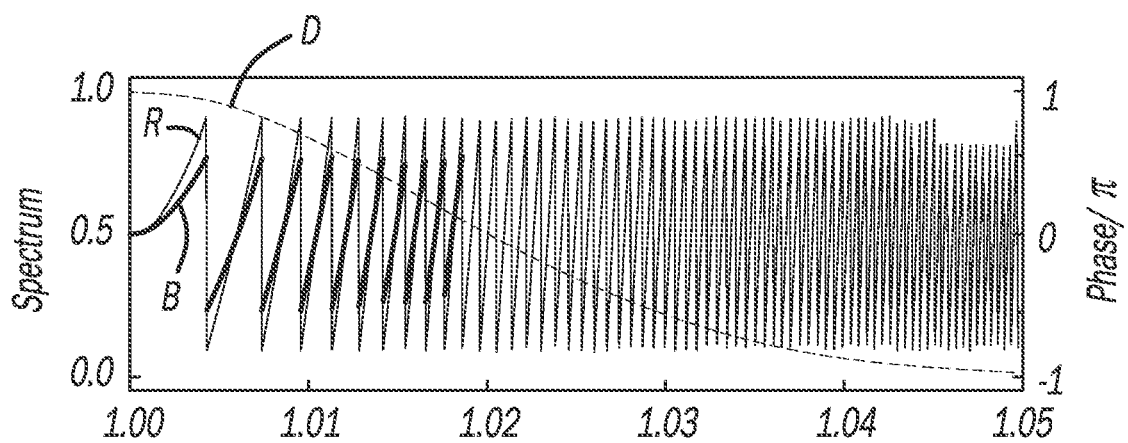
FIGS. 13A and B, 14A and B, 15A and B, 16A and B, and 17A and B are graphs showing expected results for a stretched pulse compressing using a binary phase function with different imperfections, employing the present laser apparatus.
Figure 13B:
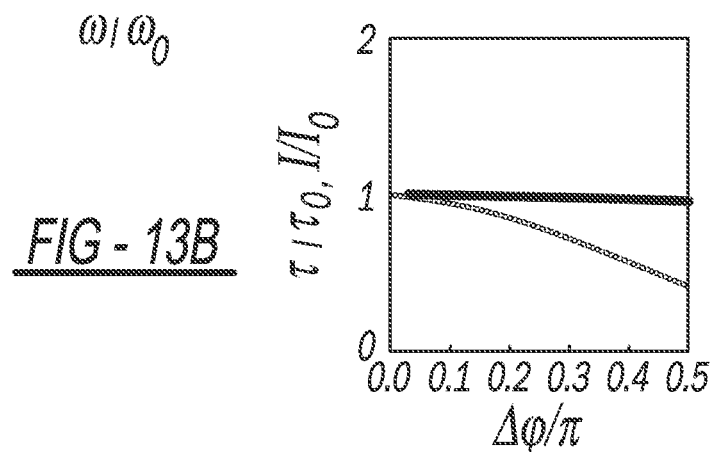
Figure 14A:
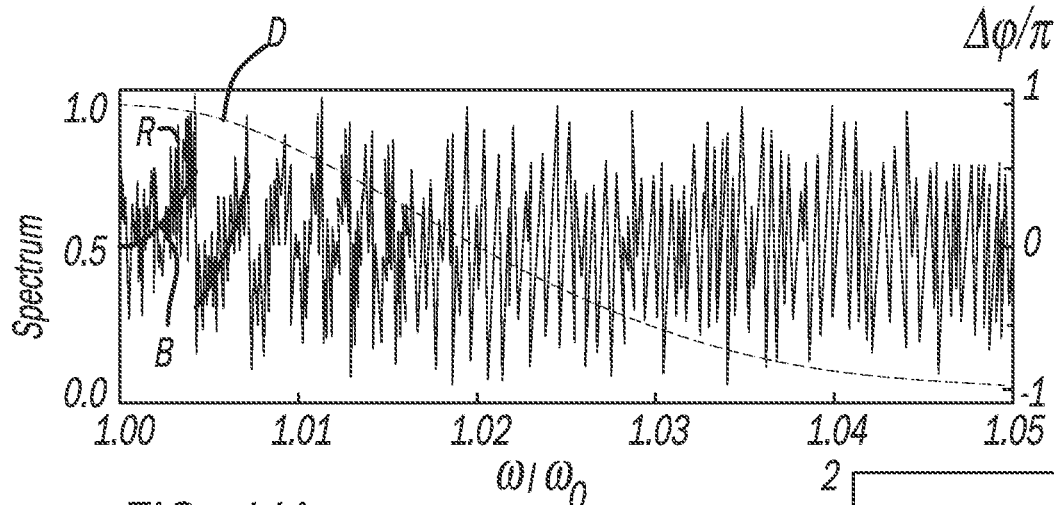
Figure 14B:
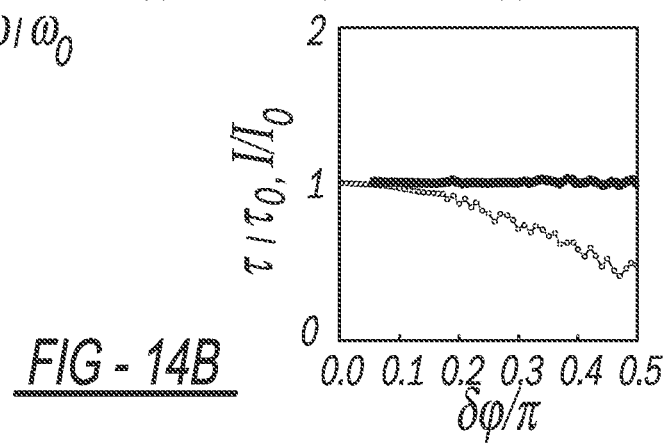

Imperfections in the implementation of binary-phase compression are considered as to how they affect the quality of the compressed pulses using two parameters to characterize deviations from the optimum TL pulse target. Specifically, the compression ratio ($\tau/\tau_0$), where 1.0 is considered perfect, and amplitude ($I/I_0$), which is the ratio between the peak intensity of the compressed pulse using "perfect" binary-phase compression is analyzed, remembering $I_0 \approx 0.4 I_m$ where $I_m$ is peak intensity of the fully compressed pulse, and imperfect binary-phase compression. In particular, the following five imperfections are considered, and the expected results are summarized in FIGS. 13A and B, 14A and B, 15A and B, 16A and B and 17A and B. First, a systematic error in accuracy $\Delta\varphi$ is introduced in the value of $\pi$ (FIGS. 13A and B). Second, a random error in the precision $\delta\varphi$ in the phase value of $\pi$ is introduced at each pixel (FIGS. 14A and B). Third, the spectral resolution $\Delta$ of the device used to introduce the spectral phase is limited (FIGS. 15A and B). Fourth, the number of phase steps (pixels in a 4-f shaper) is limited (FIGS. 16A and B). Fifth, the binary-phase compression is designed for a value of chirp that is different from the chirp used for stretching (FIGS. 17A and B).

The optimal phase for binary compression (see line B) is plotted along with the imperfect phase (see line R). FIGS. 13A, 14A, 15A, 16A and 17A show the total spectral phase, i.e. the chirp required to stretch the pulses by a factor of 100 and the binary-phase applied for compression. This is why the phases in these figures look like a 'saw tooth' and not like a 'staircase.' Because phase is a cyclic parameter with period $2\pi$ the wrapped phase is plotted. FIGS. 13B, 14B, 15B, 16B and 17B show how the compression quality degrades as a function of increasing the imperfection being tested. Points on lines B give the compression quality ($\tau/\tau_0$) and open points are the intensity ($I/I_0$).

In FIGS. 13A and B, the effect of using an imperfect value of $\pi$ is graphed, using $1.5\pi$. Interestingly, deviations from $\pi$ do not affect the compressed pulse duration, and only the peak intensity of the compressed pulse is affected. As long as the phase inaccuracy is less than $0.1\pi$, even the amplitude of the compressed pulse is not affected. In FIGS. 14A and B, the effect of random phase fluctuations is shown. Not surprisingly, the results are very similar to those in FIGS. 13A and B. Therefore, the accuracy and precision behave similarly, and as long as phase precision and accuracy are within $0.1\pi$, compression and amplitude are unaffected.

FIGS. 15A and B depict limited spectral resolution $\Delta$ of the phase steps. Surprisingly, spectral resolution does not decrease the quality of the compression in terms of duration or intensity. Moreover, limited resolution suppresses the temporal wings of the output pulse. Mathematically it is a consequence of the convolution theorem; limited spectral resolution suppresses temporal components far from the pulse. In fact, this effect can be used to 'clean up' the pulse.

FIGS. 16A and B graph the limitation in the number of phase steps or pixels when using a pixelated pulse shaper. Calculated results starting from 500 intervals (pixels) and reduced to 100 are evaluated across the entire spectrum (within $\pm 0.1\omega_0$). As long as the number of intervals equals the stretching factor, there is little or no degradation of the compression quality in time or intensity.

Finally, in FIGS. 17A and B, the binary-phase mask is designed for a different compression factor. A 1% difference in the stretched pulse duration results in a compressed pulse that is 30% longer than the original with an intensity that is 20% lower, as in the shown example where a pulse that was stretched 101 times is being compressed using a binary mask that is designated for a stretching factor of 100. This sensitivity is noteworthy and implies that practical implementations will require some level of fine adjustment. This is typically available in the stretcher of ultrafast lasers.

C.5 High-Contrast Compressed Pulses

While binary phase compression performs quite well, 60% of the pulse energy ends up as a pre- and post-pulse pedestal. The elimination of this pedestal is now addressed given that a noteworthy parameter of pettawatt and higher energy laser pulses is the contrast ratio of the pulses, which is the ratio between the peak intensity of the pulse to the pre-pulse intensity. The reason for requiring a high contrast is that most atoms and molecules ionize at peak laser intensities of $10^{14}$ W/cm$^2$, therefore a laser pulse such as those shown so far with contrast ratios of $10^{-2}$, would pre-ionize the target well ahead of the main pulse arrival, such that plasma expansion would obscure the interaction with the main pulse. The pre-ionization time can be greatly shortened by increasing the contrast ratio of the pulses. Experiments in the relativistic optics regime and higher require contrast ratios between 9-10 orders of magnitude.

A plasma mirror and cross-polarized wave generation ("XPW") are considered with regard to the present different approaches that have been demonstrated for improving the contrast ratio of intense femtosecond pulses. The plasma mirror approach takes advantage of the plasma formed on the surface of a dielectric placed in vacuum. When the intensity of the incident pulse is low it transmits through the dielectric, however, when the intensity is sufficiently high it becomes reflective in what is known as a self-shuttering effect. The plasma mirror method achieves a two-order of magnitude improvement in the contrast ratio of the leading edge of the pulses with transmission reaching 70%. Moreover, higher contrast ratios can be reached by a double plasma mirror arrangement.

A second method for increasing the contrast ratio of the present high-energy laser pulses is XPW, where a strong linear polarized pulse generates perpendicular polarized light through third-order nonlinear optical process in a crystal. The weak background wings generate much smaller perpendicularly polarized signal, therefore the expected contrast ratio of XPW would be in a cubic order with respect to the original stretching factor with an experimental active efficiency of up to 25%. XPW is here evaluated to see if it can suppress the temporally dispersed signals arising from binary-phase compression. The formula used to calculate the XPW field is $$E_{XPW}(t) \propto X^{(3)} E(t) E^*(t) E(t). \quad (12)$$

Figure 18B:
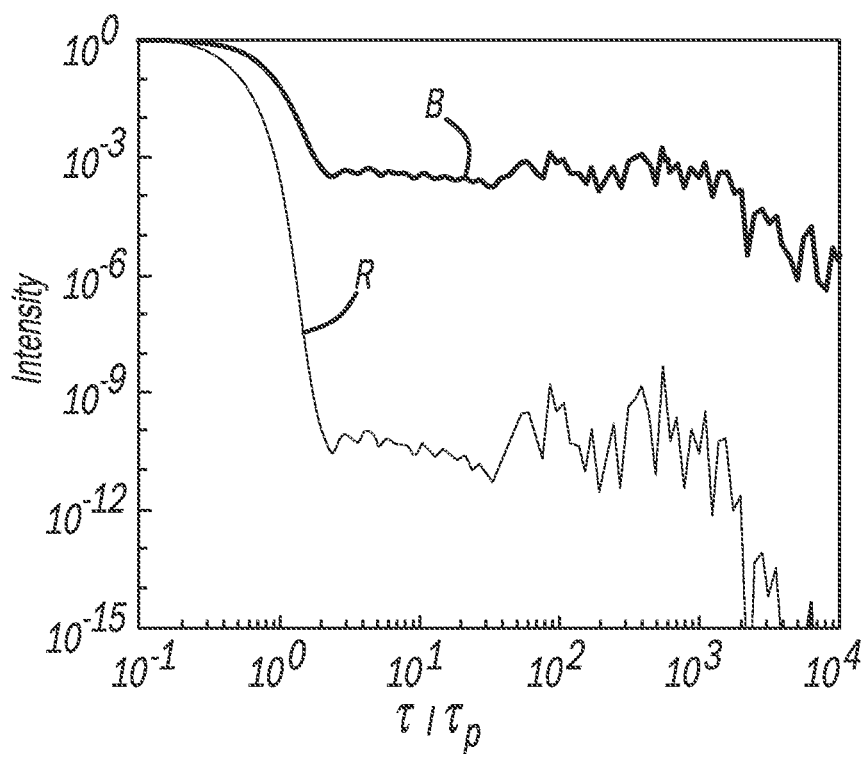
Figure 18C:
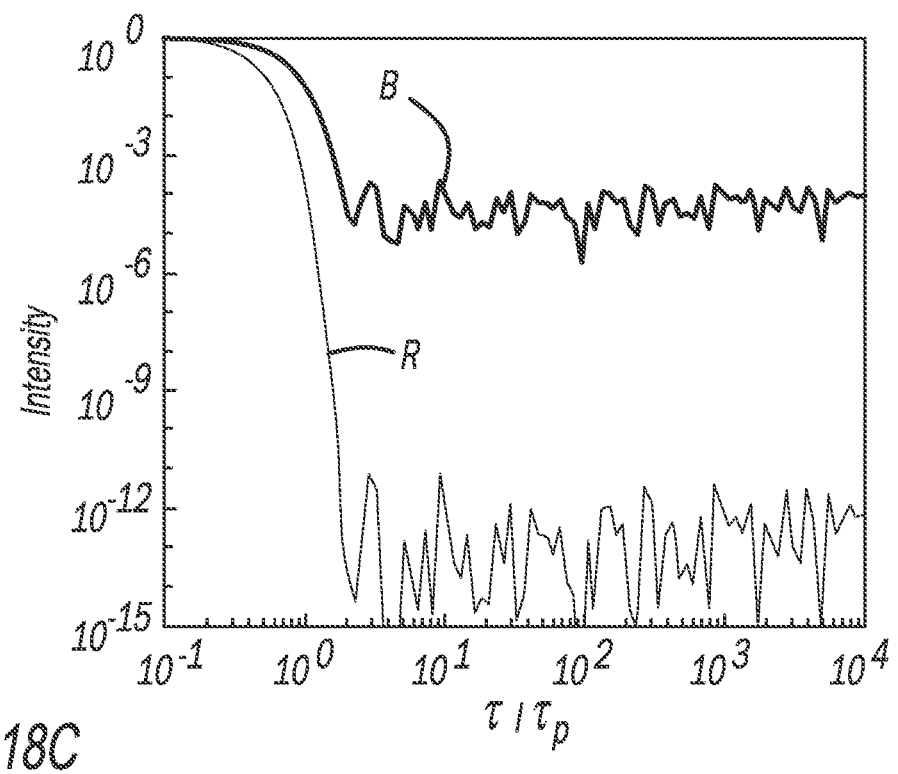

Results of calculations incorporating XPW for pulses with initial temporal chirp-stretching $10^2$ (a), $10^3$ (b) and $10^4$ (c), are shown in FIGS. 18A-C. Lines B correspond to the time profile of the initially stretched pulses followed by binary-phase compression. Lines R correspond to the same pulses after XPW filtering. For pulses initially stretched 100 times as illustrated in FIG. 18A, the contrast ratio improves by $10^2$ and the cleaned pulses have a contrast better than $10^6$. For pulses initially stretched by a factor of 1000 where the contrast after XPW is then better than $10^9$. FIG. 18B shows pulses stretched by $10^4$ illustrated in FIG. 18C, as would be used in a CPA system, XPW increases the contrast by about eight orders of magnitude. The binary-phase compressed and XPW filtered pulses achieve a contrast of $10^{12}$. The dependence of XPW filtering on initial stretching can be explained as a function of how spread out are the dispersed components that are not compressed by the coarse choice of phases (0 and $\pi$). Greater initial stretching leads to greater spreading, which implies greater contrast gain. In addition to the improved contrast ratio, the third-order dependence of XPW leads to some pulse compression beyond the original transform limit.

D. Single Optic Dispersion Compensator

Figure 1:
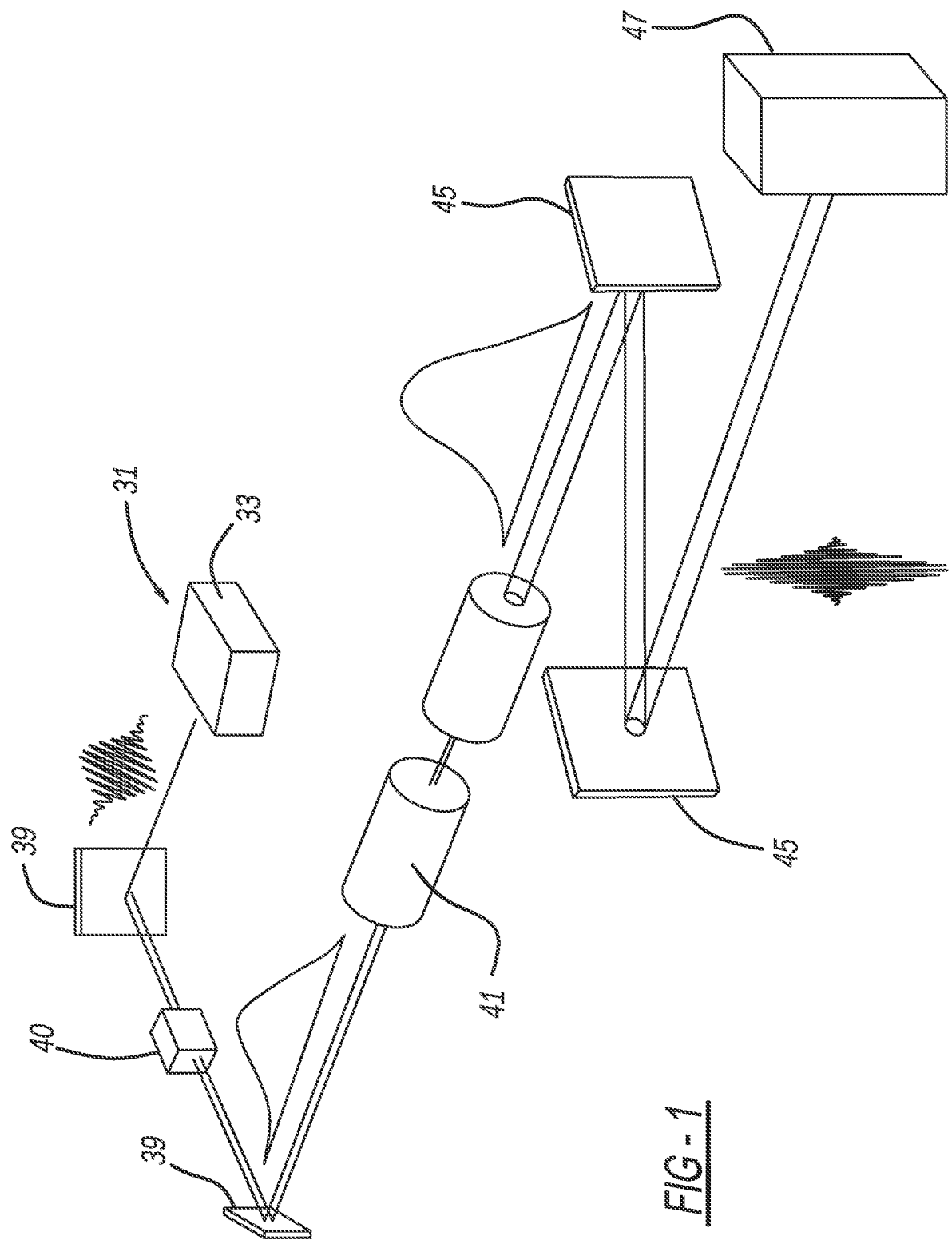
FIG. 1 is a diagrammatic view showing the present laser apparatus.
Figure 2:
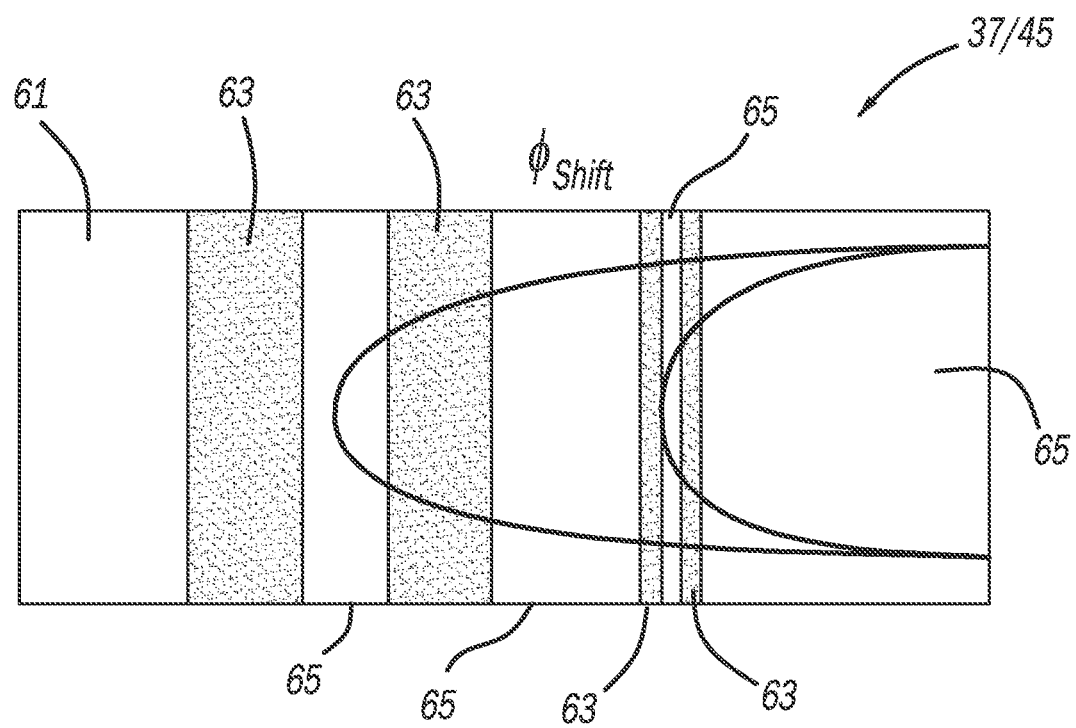
FIG. 2 is a cross-sectional view showing an optic employed in the present laser apparatus.

A commercial hardware set up can be observed in FIGS. 1 and 2. A simplified set up of the present apparatus employs a laser 31 having an oscillator 33, simple reflective mirrors 39, the present monothic and single transmissive dispersive optic 40 acting as a stretcher, an amplifier 41, multiples of the present monothic mirror optics 45 acting as a compressor 45. A workpiece 47 or specimen acted upon by the laser pulse 49 is downstream of the compressor 45 and mirror 43. The exemplary stretcher optic 40 is illustrated as a volume Bragg grating and the exemplary compressor optic(s) 45 is illustrated as two (or more) multilayer, dielectric mirrors, all of which employ the present phase wrapping and discontinuous phase jumping technology. It should alternately be appreciated, however, that the present mirror(s) may be employed in the stretcher and/or the compressor. It should further alternately be appreciated that the present grating may be employed in the compressor and/or the stretcher. If one of the stretcher and the compressor are alternately of a conventional construction then they will include additional optics such as a traditional mirror or traditional grating plus a mirror, such that the present monolithic optic(s) will only be used as either a compressor or stretcher.

The present monolithic optic 40/45 includes a glass substrate 61 upon which are multiple coating layers 63 with coating layers 65 therebetween, which have different indices of refraction.

For the mirror version, a single chirped mirror or more preferably, a pair of complementary chirped mirrors, introduces the phase steps at specially designed wavelengths in order to achieve the desired compression. The location of the ripples in the spectral domain can be controlled accurately, as evidenced by matched pairs of chirped mirrors. It is noteworthy, however, that the present apparatus employs phase wrapping to overcome the dispersion limitations of traditional chirped mirrors. Achieving the sharp $\pi$ steps is not critical as shown in FIGS. 13-17 where the spacing is need but the phase value and sharpness are not important. In terms of the final contrast ratio, The binary-phase compression combines well with XPW filtering, and can lead to high contrast pulses.

Figure 19:
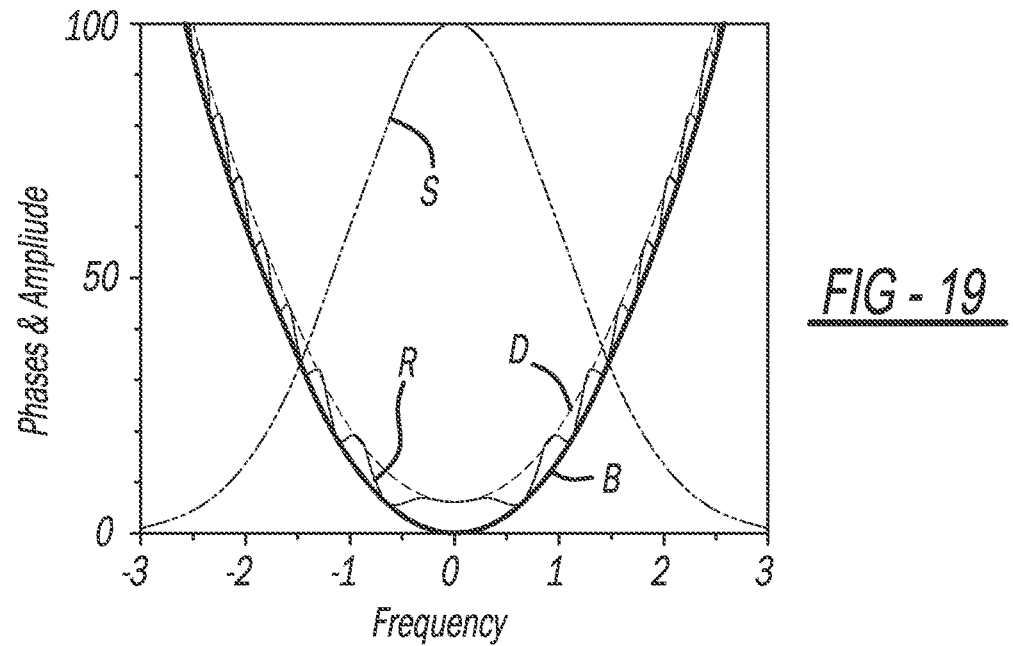
FIG. 19 is a graph showing expected spectrum phases of a stretched pulse which is binary phase recompressed, using the present laser apparatus.
Figure 20:
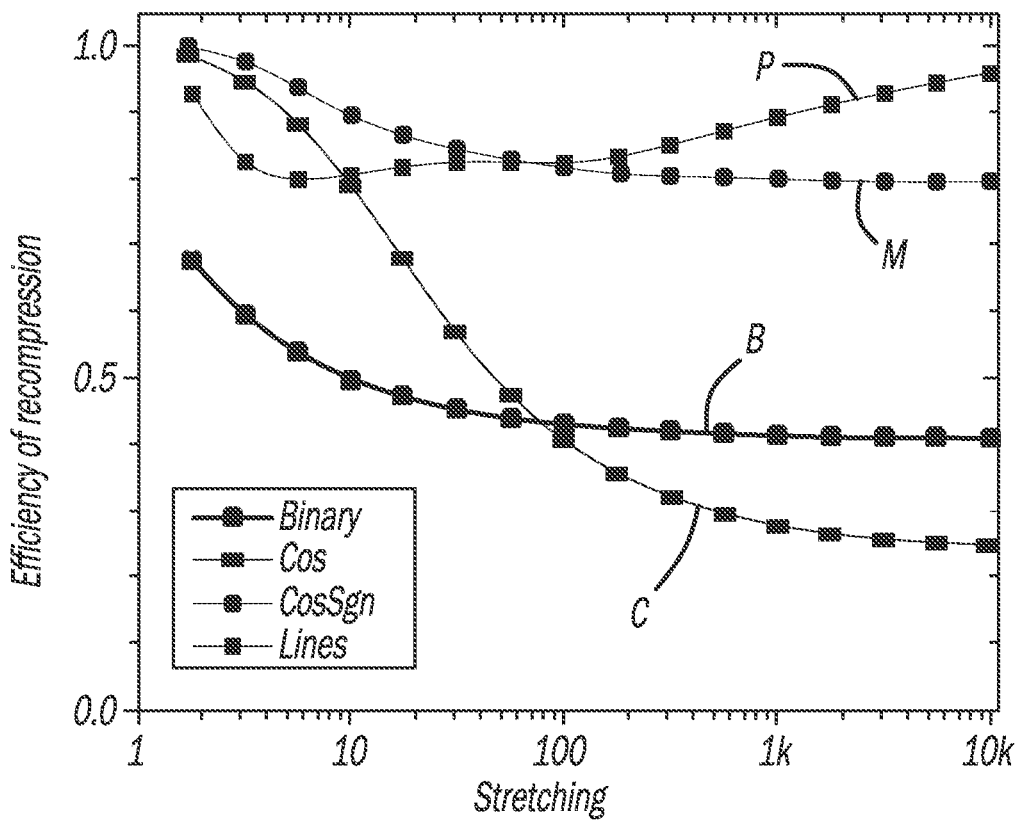
FIG. 20 is a graph showing a comparison of expected different modulations of a binary phase recompressed pulses, using the present laser apparatus.
Figure 22:
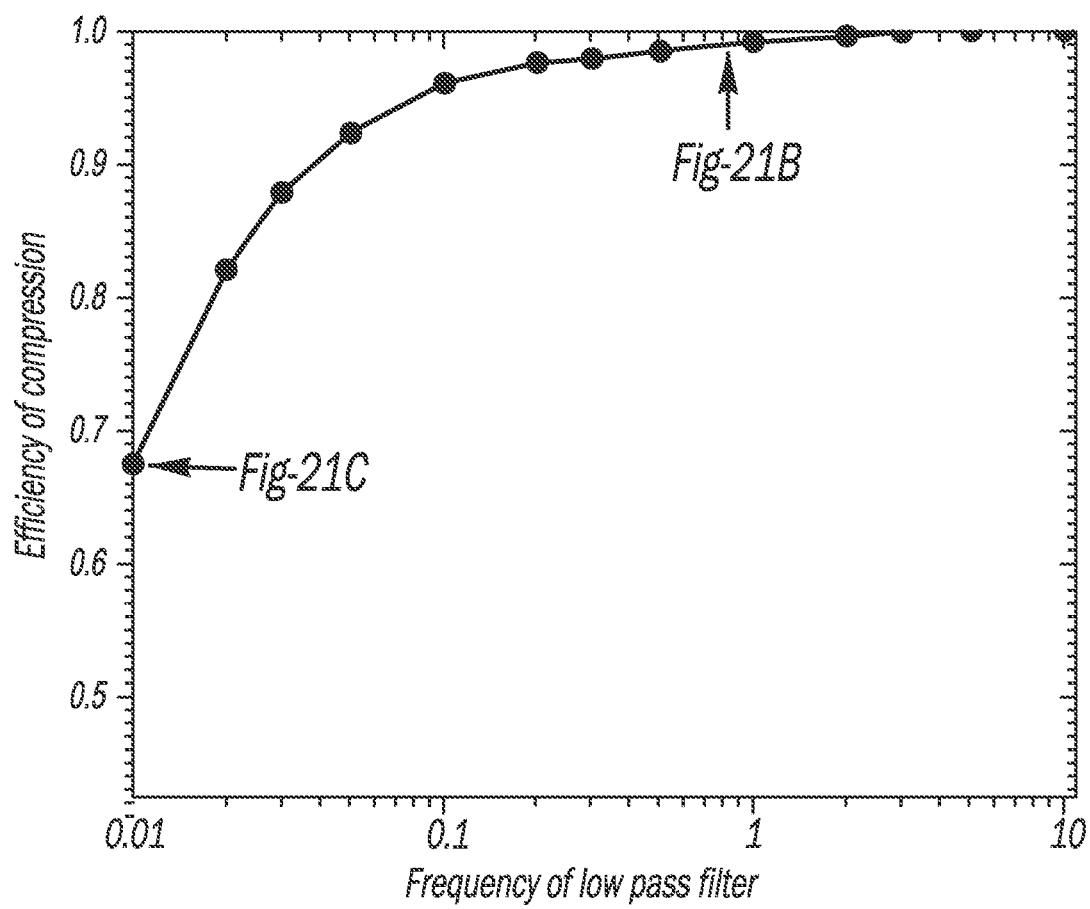
FIG. 22 is a graph showing expected results of the wrapped phase of the chirped pulse of FIGS. 21B and C, using the present laser apparatus.

Referring to FIGS. 19 and 20, a comparison is made with the efficiency of binary phase compression with cosine phase compression and with a piecewise linear function that wraps every $2\pi$. FIG. 19 shows a spectrum (dotted line S) and phases (solid line B) of stretched pulse $\phi$ (R) phase of recompressed pulse $\phi''$ (dashed line D) $\phi''+2\pi$. FIG. 20 shows a comparison of different modulation binary (line B), cosine (line C), modified cosine line M, and piecewise linear (line P).

For a pulse stretched T times, the cosine phase given by phi-prime provides compression to transform limited. The efficiency is >80% for factors of 10× and 50% for factors of 100×. A factor of 10× is expected to work remarkably well and require very few oscillations within 90% of the spectral energy of the pulse. For greater compression factors, binary phases are more efficient. However, the binary and cosine results are not as good as those for the modified cosign and piecewise linear modulations. For those simulations, two new different approaches were employed. First, the cosine function seemed to be "out of phase" half of the time. Thus, the phase function flipped thereby leading to the modified cosign results with efficiencies approaching 80%. The "flipped cosine function" is shown as Equation (14). That spectral phase function is a bit more complicated but leads to much better results.

Figure 23A:
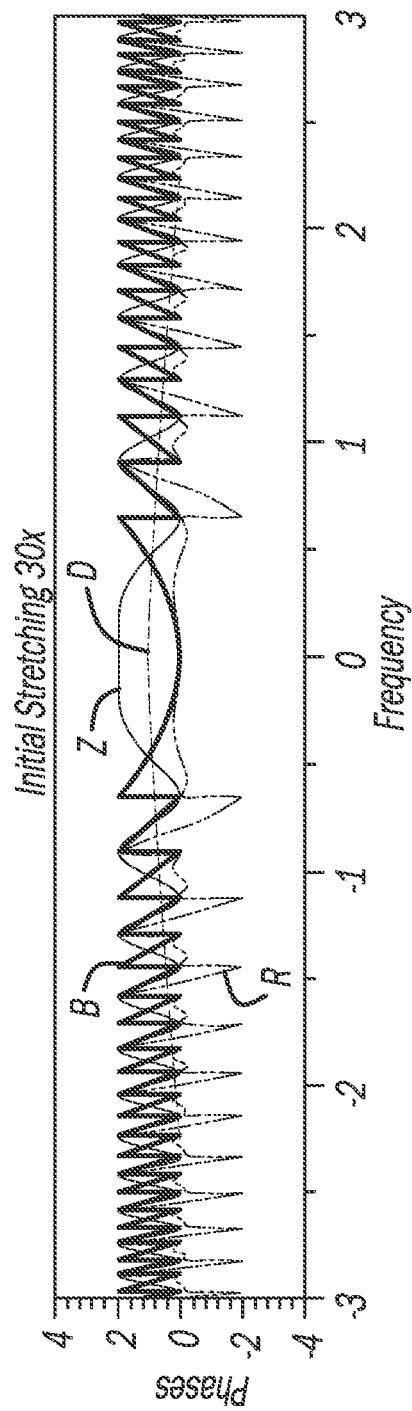
FIGS. 23A-C are graphs showing expected results of pulse phases versus frequency, using the present laser apparatus.
Figure 23B:
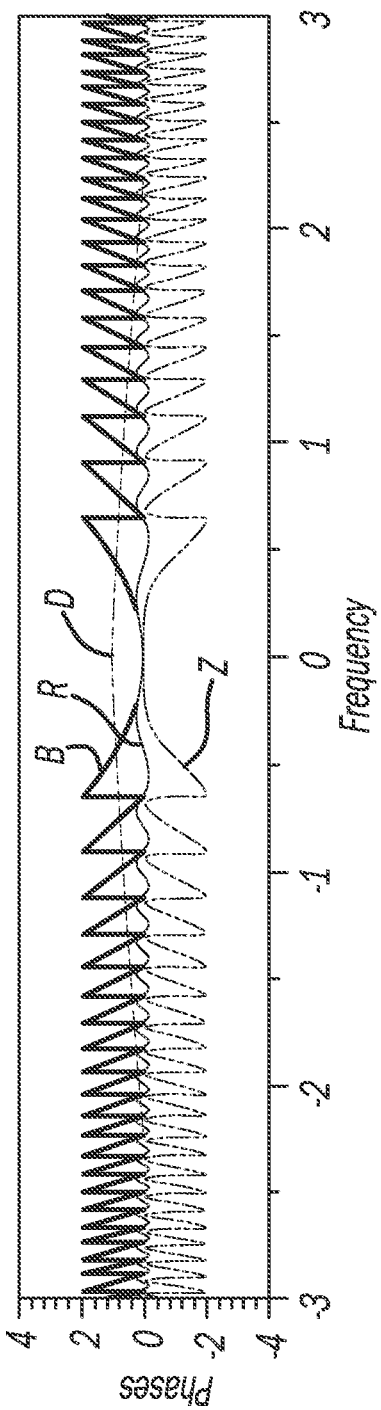
Figure 23C:
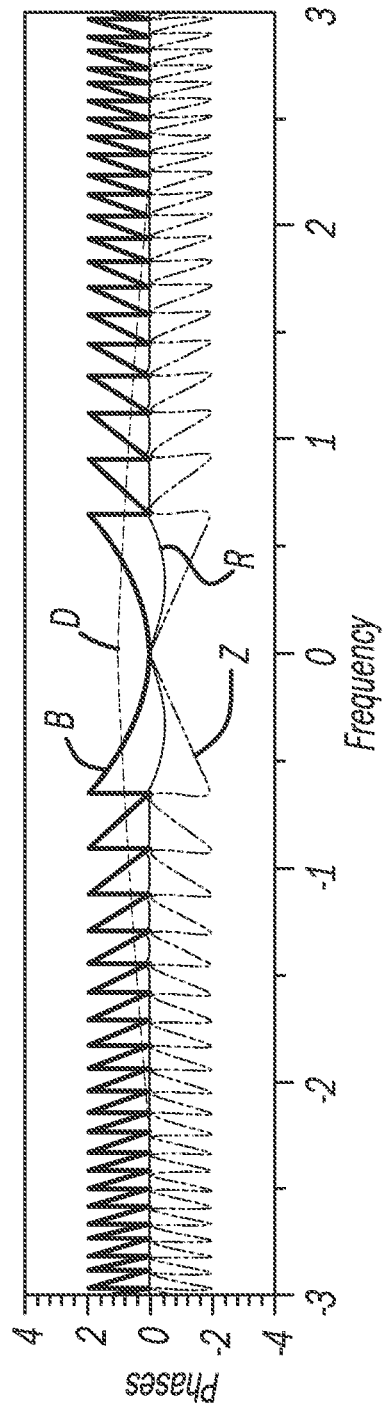

Finally, it is much simpler to approximate the phase required by a piecewise line that wraps every $2\pi$. The three different phases are illustrated in FIGS. 23A-C. FIG. 23A corresponds to a cosine, FIG. 23B to a cosine with a flip, and FIG. 23C to the piecewise linear. FIG. 23A employs a phase of the following equation:

$$\phi'(\omega) = \{\pi \cos[0.25(\omega-\omega_0)^2 \tau_0 T] + \pi\} \quad (13)$$

FIG. 23B employs a phase of the following equation:

$$\phi'(\omega) = \{\pi \cos[0.25(\omega-\omega_0)^2 \tau_0 T] + \pi\} \left\{ \left[1 - (-1)^{\text{Floor}\left[\frac{(\omega-\omega_0)^2 \tau_0 T}{4\pi}\right]}\right] \pi - 2\pi \right\} \quad (14)$$

And, FIG. 23C employs a linear approximation of the phase.

The numerical simulations of FIGS. 23A-C have not taken into account the effect of smoothing. When these phases are introduced by multilayered optics, it is difficult to get very sharp changes in phase without introducing multiple dielectric layers. The present single optic construction with fewer layers leads to broader "smoother" frequency changes. The effect of this smoothing is evaluated below. From the simulations above, it can be observed that even for quite heavy smoothing corresponding to 5% of the spectral bandwidth (FWHM), the results are quite acceptable with an efficiency ~50%. All the simulations shown are compressing a "linearly chirped" pulse. However, regardless of the dispersion one is trying to compress (e.g., linear, quadratic, cubic, high-order) the spectral phase can be approximated by cosine, flipped cosine, binary, or piecewise linear and corrected.

Figure 24:
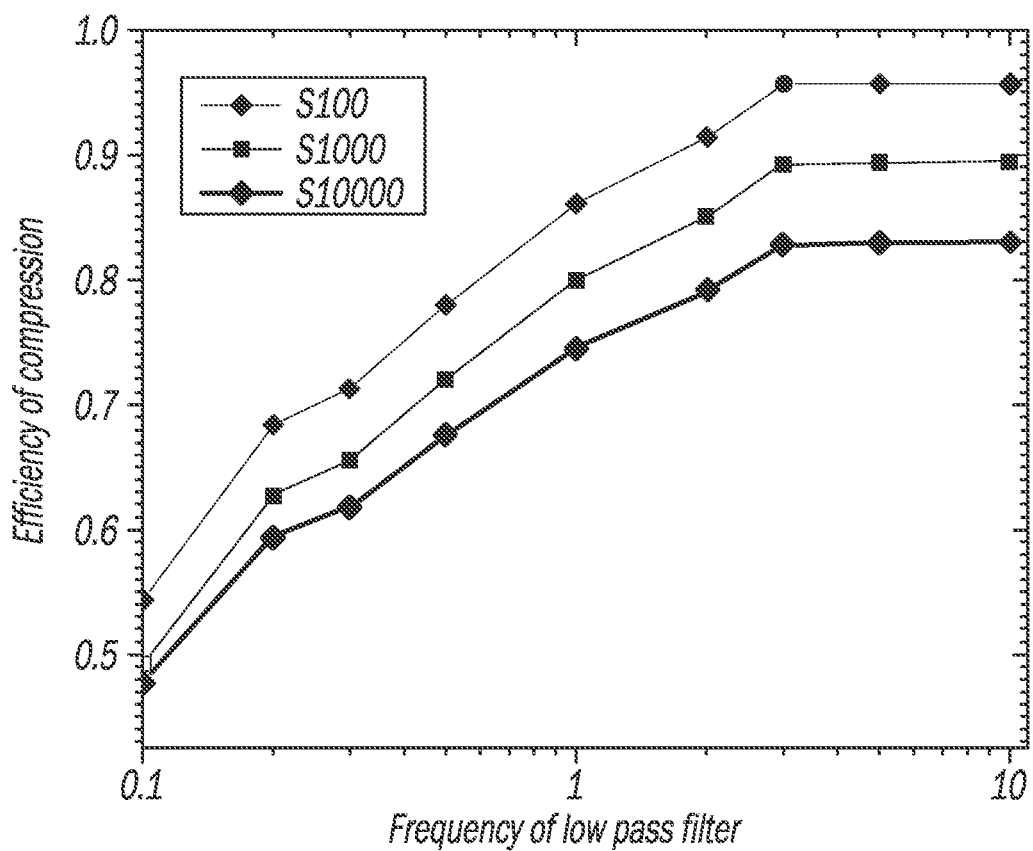
FIG. 24 is a graph showing expected smoothing of phase modulation results of stretched pulses, using the present laser apparatus.
Figure 25A:
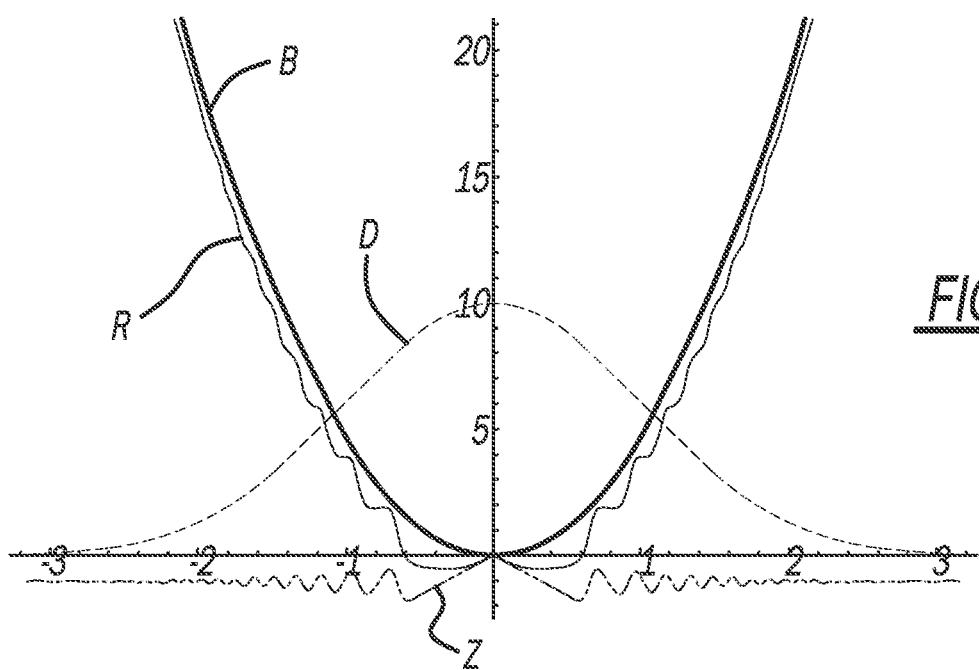
FIGS. 25A-C are graphs showing examples of expected low pass filter phases, using the present laser apparatus.
Figure 25B:
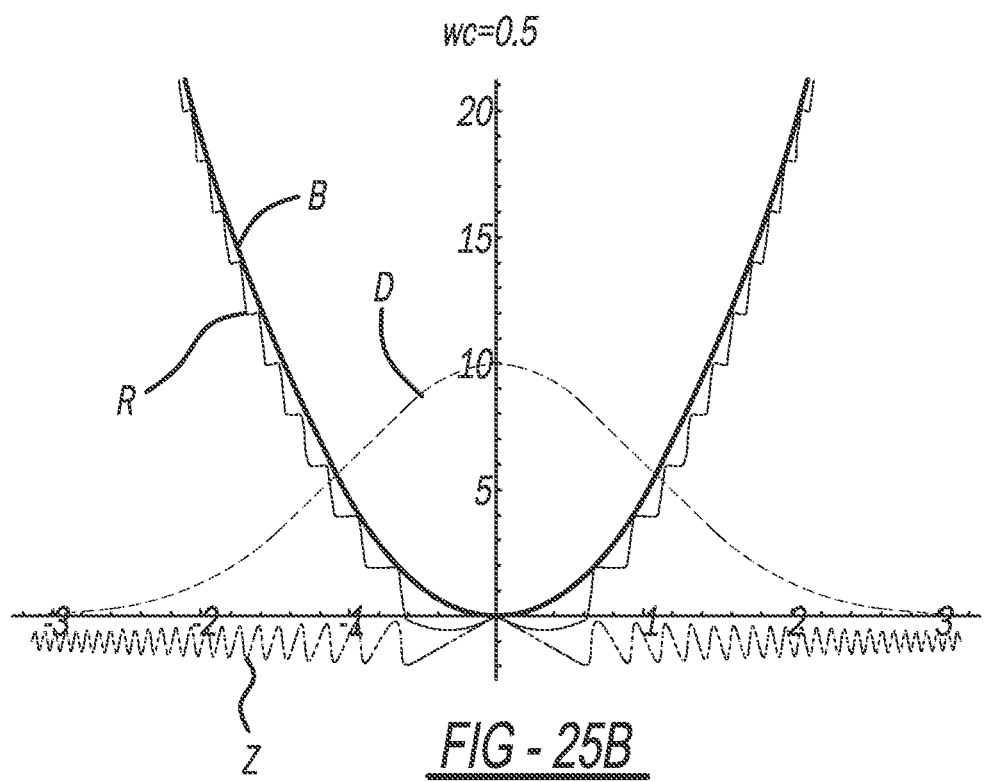
Figure 25C:
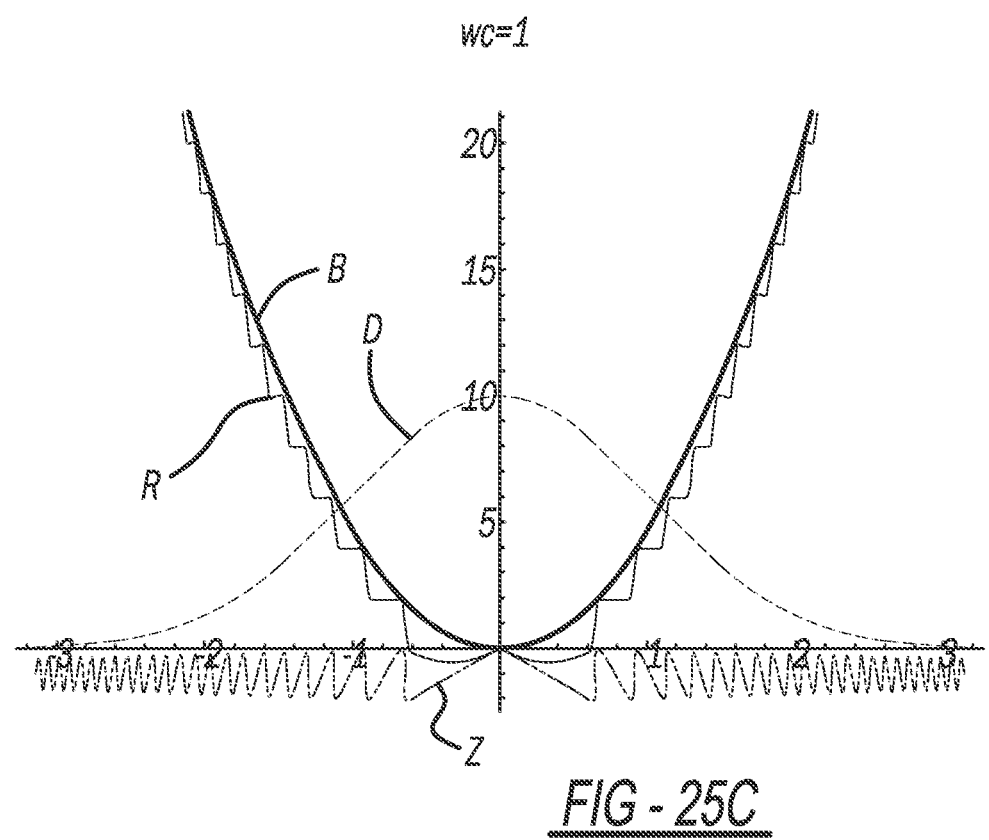

FIG. 24 illustrates the expected effect of smoothing of phase modulation on 100, 1000 and 10,000 times stretched pulses by a piecewise linear function. FIGS. 25A-C show expected examples of low pass filtered phases, where wc=low pass filter frequency.

Figure 3:
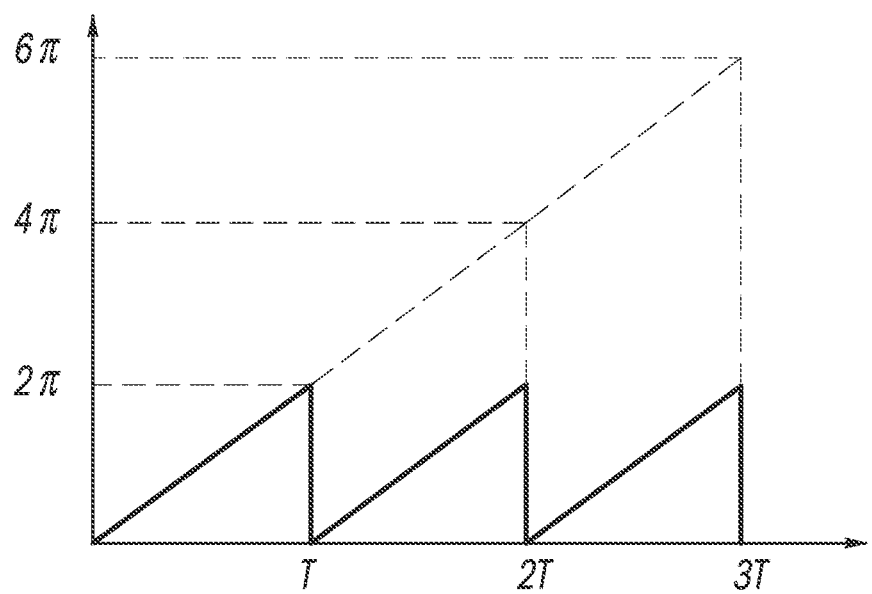
FIG. 3 is a graph showing phase wrapping employed with the present laser apparatus.
Figure 4A:
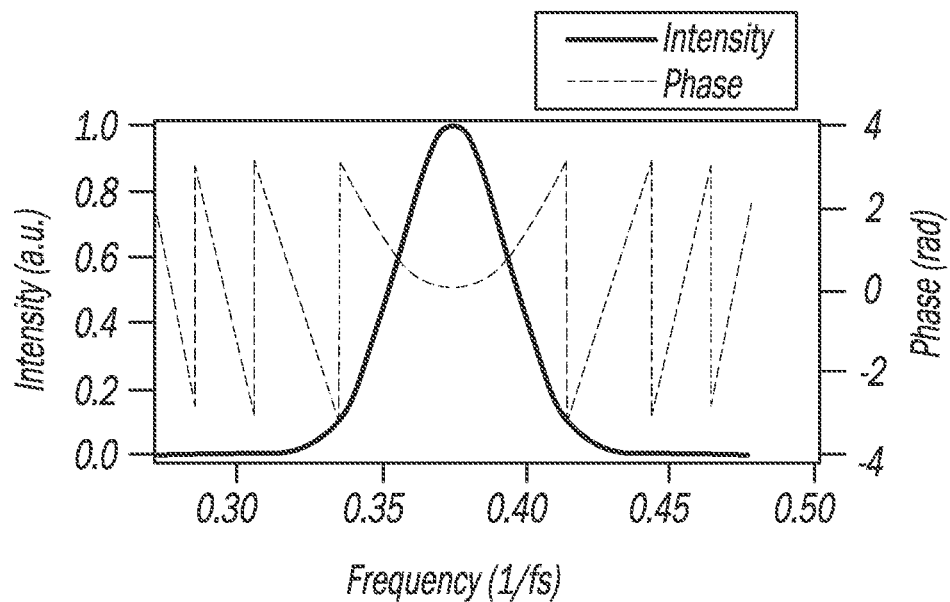
FIGS. 4A and 4B are graphs of a wrapped phase and an unwrapped phase employed with the present laser apparatus.
Figure 4B:
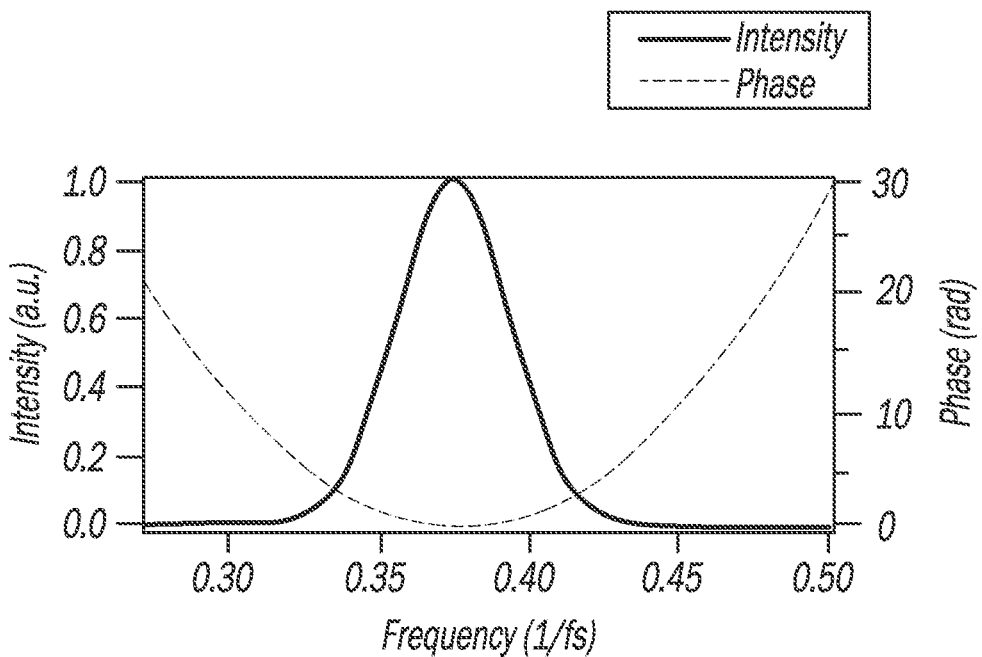

The phase wrapping and unwrapping will now be discussed with regard to the present compressing or stretching optic. FIG. 3 presents a generic image of how a linear phase (dashed and diagonal line) is wrapped modulo $2\pi$. Every time the phase reaches a factor of $2\pi$, it is brought back to zero. The results are the little prisms that act like a cross-section of a Fresnel lens. Parabolic (linear chirp) phases or third- and higher-order dispersion phases are employed. They all can be wrapped modulo $2\pi$. In the plot shown in the figure, the horizontal axis T is replaced by frequency. FIGS. 4A and B illustrate wrapped and unwrapped phases respectively. The solid lines are intensity and dashed lines are phase. This is applied to a parabolic phase. The phase ranges from $-\pi$ to $\pi$ But it often helps to "unwrap" it. This involves adding or subtracting $2\pi$ whenever there's a $\pi$ phase jump. These figures illustrate an example using a pulse with quadratic phase.

In terms of commercial implementation, chirp pulse amplification laser systems typically require stretching and compression factors of four to five orders of magnitude. For such levels, programmable pulse shapers are not presently practical. As compared to traditional laboratory pulse compressors for petawatt and exawatt ultrafast lasers which require extremely expensive optics exceeding 1 m$^2$ in size placed in large vacuum chambers, the present optic is considerably smaller, thinner and less expensive. Furthermore, the present commercial version of the apparatus does not use programmable pulse shapers (e.g., SLM) to compress amplified pulses. Instead the present compressor or stretcher optic 40/45 is a volume Bragg grating or a multilayer dielectric mirror. For example, a New Focus NIR5102 mirror, having multilayer high-reflectance coatings, which introduces discontinuous phase jumps.

Control of the steepness of the spectral-phase steps uses "apodization." To achieve alternation of 0 and $\pi$ spectral modulation, analogous to multi-spectral notch interference filters, a smooth modulation of an index of refraction can be used. To compress a pulse N times, approximately a spectral phase function with N phase points or N coating layers on the optic glass substrate. Binary-phase compression combines well with XPW filtering and can lead to high contrast ratio pulses with the present apparatus and method. The present optic provides phase modulation compression which is achieved by small phase shifts between spectral components due to the many coating layers.

The advantageously thinner (and thus, less expensive) "depth" or "thickness" of the present compressive or stretching optic can be understood from the following comparison:

(a) Conventional approach:

The maximum length of the pulse in the time domain $T_{max}$, determines the maximum thickness of the coating $C_{max}$, given an average index of refraction Na, and the speed of light c. Such that $C_{max}=(c/Na)*T_{max}$. A numerical example supposes $T_{max}$=1 ps, c=0.3 mm/ps, Na=2. Then the thickness of the coating $C_{max}$=(0.3mm/ps./2)*1 ps=0.15 mm or 150 microns. If this is a multilayer mirror, then the light traverses the coating twice so the thickness is only one half of the calculated value or 75 microns thick. Volume Bragg Gratings have much greater thicknesses, so a numerical example would be: $T_{max}$=100 ps, c=0.3 mm/ps, Na=1.6. Then the length of the Bragg Grating $C_{max}$=(0.3 mm/ps./1.6)*100 ps=18.72 mm. In the case of Bragg Gratings, the medium itself is thick enough to introduce additional dispersion so it is not unusual for these to be up to 10 cm in thickness.

(b) In contrast, the present optic is at least a factor of 2 thinner, or shorter along the optical path than what would be calculated following the formula given above. Thus, it is expected that the present optic will have a total coating layer thickness of less than 5 cm, and more preferably less than 2.5 cm if a grating, and less than 38 microns, and more preferably less than 19 microns if a mirror.

Moreover, the grating version of the present apparatus advantageously provides a single compressive (or stretching) optic which does not require alignment as do conventional multi-optic systems. Furthermore, multiple compressing or stretching chirped mirrors of the present optic do not require the traditional alignment accuracy of traditional grating pair stretchers or compressors. Thus, no expert is needed to align compressor or stretcher optics, and the present thinner optic can be inexpensively mass produced, at relatively large quantities.

The present optic and method retard a phase of frequency regions of the laser pulse by a factor of $2\pi$ or less, with the stretching or compressing of the pulse being at least 100 times with an energy efficiency of at least 70%. Furthermore, the mirror or grating versions change the phase only for frequency components that are out of phase. This apparatus and method are ideally suited for use with a pulse duration of less than 1 picosecond and more preferably at or less than 100 femtoseconds, with an energy of at least 1 mJ.

While various embodiments have been disclosed, it should be appreciated that additional variations of the laser apparatus and method are also envisioned. For example, while exemplary expected results have been disclosed, the actual results may vary. Moreover, additional or different hardware components may be used although certain of the present advantages may not be fully realized. While certain types of optical and laser components have been disclosed it should be appreciated that alternate components may be used although all of the present advantages may not be fully achieved (for example, other gratings than just volume Bragg gratings, and other types of mirrors, may benefit from the present construction and method of use). It is also noteworthy that any of the preceding features may be interchanged and intermixed with any of the others. Accordingly, any and/or all of the dependent claims may depend from all of their preceding claims and may be combined together in any combination. Variations are not to be regarded as a departure from the present disclosure, and all such modifications are entitled to be included within the scope and sprit of the present invention.

The invention claimed is:

1. A method of using a laser apparatus, the method comprising:
(a) emitting a laser pulse;
(b) stretching the laser pulse;
(c) amplifying the stretched laser pulse;
(d) compressing the amplified laser pulse;
(e) using an optic to perform at least one of the stretching or the compressing, wherein the optic includes two or more discontinuous phase jumps;
(f) introducing, using the optic, a spectral phase value between and including 0 and $2\pi$ in the two or more discontinuous phase jumps;

(g) transmitting or reflecting the laser pulse with the optic; and (h) performing the stretching or the compressing of the laser pulse at least 100 times.

2. The method of claim 1, further comprising reflecting the laser pulse with the optic which is a multi-layer chirped mirror.

3. The method of claim 1, further comprising transmitting the laser pulse through the optic, the optic being a volume grating which is the sole optic acting to stretch or compress the laser pulse.

4. The method of claim 1, further comprising:
using at least another optic to stretch the laser pulse; and
the phase wrapping optic performing the compressing.

5. The method of claim 1, further comprising:
using at least another optic to compress the laser pulse; and
the phase wrapping optic performing the stretching.

6. The method of claim 1, cross-polarized wave filtering of the laser pulse with the optic to increase a contrast of the laser pulse.

7. The method of claim 1, further comprising:
creating binary phase compression, independent of a spectrum of the laser pulse, by interacting the laser pulse with spaced apart coatings on the optic which is monolithic; and
the laser pulse having a duration less than 1 picosecond.

8. The method of claim 1, wherein the optic changes the phase only for certain frequency components.

9. The method of claim 1, wherein the optic introduces in specific frequency regions at least one linear spectral phase to compress that frequency portion of the laser pulse.

10. The method of claim 1 wherein each of the two or more discontinuous phase jumps receives a fraction of a total spectral phase function limited in magnitude to 0 to $2\pi$.

11. The method of claim 1 wherein the spectral phase value is either 0 or $\pi$ in the two or more discontinuous phase jumps.

12. A method of using a laser apparatus, the method comprising:
(a) emitting a laser pulse;
(b) stretching, using an optic, the laser pulse;
(c) compressing, using the optic, the laser pulse using a monolithic optic including multiple layers;
(d) coatings of the optic retarding phase of different frequency regions of the pulse by a factor of $2\pi$ or less, the optic being either at least one grating or at least one mirror;
(e) repeating the stretching the laser pulse and the compressing the laser pulse; and
(f) creating multiple phase jumps of modulo $2\pi$, introduced for different frequencies, with the optic.

13. The method of claim 12, further comprising reflecting the pulse with the optic which is a multi-layer mirror.

14. The method of claim 12, further comprising transmitting the laser pulse through the optic, the optic being a volume Bragg grating.

15. The method of claim 12, further comprising shaping the laser pulse with a pulse shaper, and using the optic to implement phase wrapping.

16. The method of claim 12 wherein the optic includes two or more discontinuous spectral portions and introduces either 0 or $\pi$ in the two or more spectral portions.

17. A laser apparatus for generating a laser pulse, the laser apparatus comprising:
a predetermined and monolithic optic, including multiple layers with different refractive indices, being at least one of: (i) a grating and (ii) a multi-layer mirror; and
the layers of the predetermined and monolithic optic being adapted to:
compress and stretch the laser pulse at least 100 times, and
reflect the laser pulse to introduce at least one discontinuous wrapping phase jump for at least one set of frequencies such that the compressing or stretching the laser pulse is implemented in multiple frequency portions.

18. The apparatus of claim 17, wherein the multi-layer mirror is a multi-layer dielectric mirror using phase wrapping.

19. The apparatus of claim 17, further comprising a pulse shaper, wherein the predetermined and monolithic optic is a compressor which recompresses the laser pulse back to its transform limited pulse duration after compensation of phase distortions in the stretched laser pulse by the pulse shaper.

20. The apparatus of claim 17, further comprising:
a laser emitting the laser pulse having a duration less than 1 picosecond; and
an amplifier amplifying the laser pulse, after stretching, to have an energy of at least 1 mJ.

21. The apparatus of claim 17, wherein the layers of the predetermined and monolithic optic are spaced apart to match a phase being compensated which creates cosine phase compression independent of a spectrum of the laser pulse, and the laser pulse is chirped.

22. The apparatus of claim 17, wherein the layers of the predetermined and monolithic optic are spaced apart to match a phase being compensated by linear phase regions and result in pulse compression independent of a spectrum of the laser pulse, and the laser pulse is chirped.

23. The apparatus of claim 17 wherein includes a total coating layer thickness of the predetermined and monolithic optic is less than 5 cm.

* * * * *